United States Patent
Ida et al.

(10) Patent No.: US 7,440,614 B2
(45) Date of Patent: Oct. 21, 2008

(54) METHOD OF EXTRACTING CONTOUR OF IMAGE, METHOD OF EXTRACTING OBJECT FROM IMAGE, AND VIDEO TRANSMISSION SYSTEM USING THE SAME METHOD

(75) Inventors: Takashi Ida, Kawasaki (JP); Yoko Sambonsugi, Zama (JP); Osamu Hori, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 473 days.

(21) Appl. No.: 11/032,151

(22) Filed: Jan. 11, 2005

(65) Prior Publication Data
US 2005/0111739 A1   May 26, 2005

Related U.S. Application Data

(62) Division of application No. 09/692,457, filed on Oct. 20, 2000, now abandoned.

(30) Foreign Application Priority Data

Oct. 22, 1999  (JP) ................................. 11-301415
Mar. 31, 2000  (JP) ............................. 2000-099877

(51) Int. Cl.
  *G06K 9/00*   (2006.01)
  *G06K 9/46*   (2006.01)
(52) U.S. Cl. ....................... 382/173; 382/190; 382/193; 382/194; 382/232
(58) Field of Classification Search ......... 382/232–253, 382/173, 190, 193, 194; 709/203, 217–219, 709/231–235; 379/93.08, 100.17; 370/235
See application file for complete search history.

(56) References Cited

U.S. PATENT DOCUMENTS

| 4,183,013 | A | 1/1980 | Agrawala et al. |
| 5,247,583 | A | 9/1993 | Kato et al. |
| 5,274,466 | A | 12/1993 | Ida et al. |
| 5,331,436 | A | 7/1994 | Ida et al. |

(Continued)

FOREIGN PATENT DOCUMENTS

JP   62-120179   3/1987

(Continued)

OTHER PUBLICATIONS

Takashi Ida, et al., Proceedings of the 5th Symposium on Sensing via Image Information, C-15, pp. 115-120, "Object Contour Filling Using Self-Affine Mapping", 1999.

(Continued)

*Primary Examiner*—Brian Q Le
(74) *Attorney, Agent, or Firm*—Oblon, Spivak, McClelland, Maier & Neustadt, P.C.

(57) ABSTRACT

An object extraction method comprising the steps of comparing each portion of first image data obtained by capturing an extraction object with another portion of the first image data or second image data, thereby generating shape data as an image representing a provisional region of the extraction object in the first image data, and matching a contour of the shape data to a contour of the extraction object by using the first image data and the provisionally generated shape data.

12 Claims, 15 Drawing Sheets

U.S. PATENT DOCUMENTS

| | | | |
|---|---|---|---|
| 5,604,820 A | 2/1997 | Ono | |
| 5,930,391 A | 7/1999 | Kinjo | |
| 5,995,649 A | 11/1999 | Marugame | |
| 6,055,335 A | 4/2000 | Ida et al. | |
| 6,332,038 B1 | 12/2001 | Funayama et al. | |
| 6,335,985 B1 | 1/2002 | Sambonsugi et al. | |
| 6,449,639 B1 * | 9/2002 | Blumberg | 709/217 |
| 6,453,069 B1 | 9/2002 | Matsugu et al. | |
| 6,510,469 B1 * | 1/2003 | Starnes et al. | 709/247 |
| 6,535,632 B1 | 3/2003 | Park et al. | |
| 6,779,040 B1 * | 8/2004 | Lee et al. | 709/247 |
| 7,006,696 B2 * | 2/2006 | Huffman | 382/232 |
| 2005/0111739 A1 | 5/2005 | Ida et al. | |

FOREIGN PATENT DOCUMENTS

| | | |
|---|---|---|
| JP | 6-138137 | 5/1994 |
| JP | 6-139355 | 5/1994 |
| JP | 7-57102 | 3/1995 |
| JP | 7-105113 | 4/1995 |
| JP | 7-334690 | 12/1995 |
| JP | 8-241414 | 9/1996 |
| JP | 10-191020 | 7/1998 |
| JP | 11-98339 | 4/1999 |

OTHER PUBLICATIONS

U.S. Appl. No. 11/689,857, filed Mar. 22, 2007, Takeshima et al.

Takashi Ida, et al.; "Boundary Fitting of Extracted Objects Using LIFS": Japan Institute of Electronics, Information and Communication Engineers, Technical Report; Aug. 1999; vol. J82-D-11, No. 8; pp. 1282-1289.

Ida, T. and Sambomsugi, Y., Object Contour Fitting Using Self-Affine Mapping. Research and Development Center, Toshiba Corp., Jun. 1999, pp. 115-120.

* cited by examiner

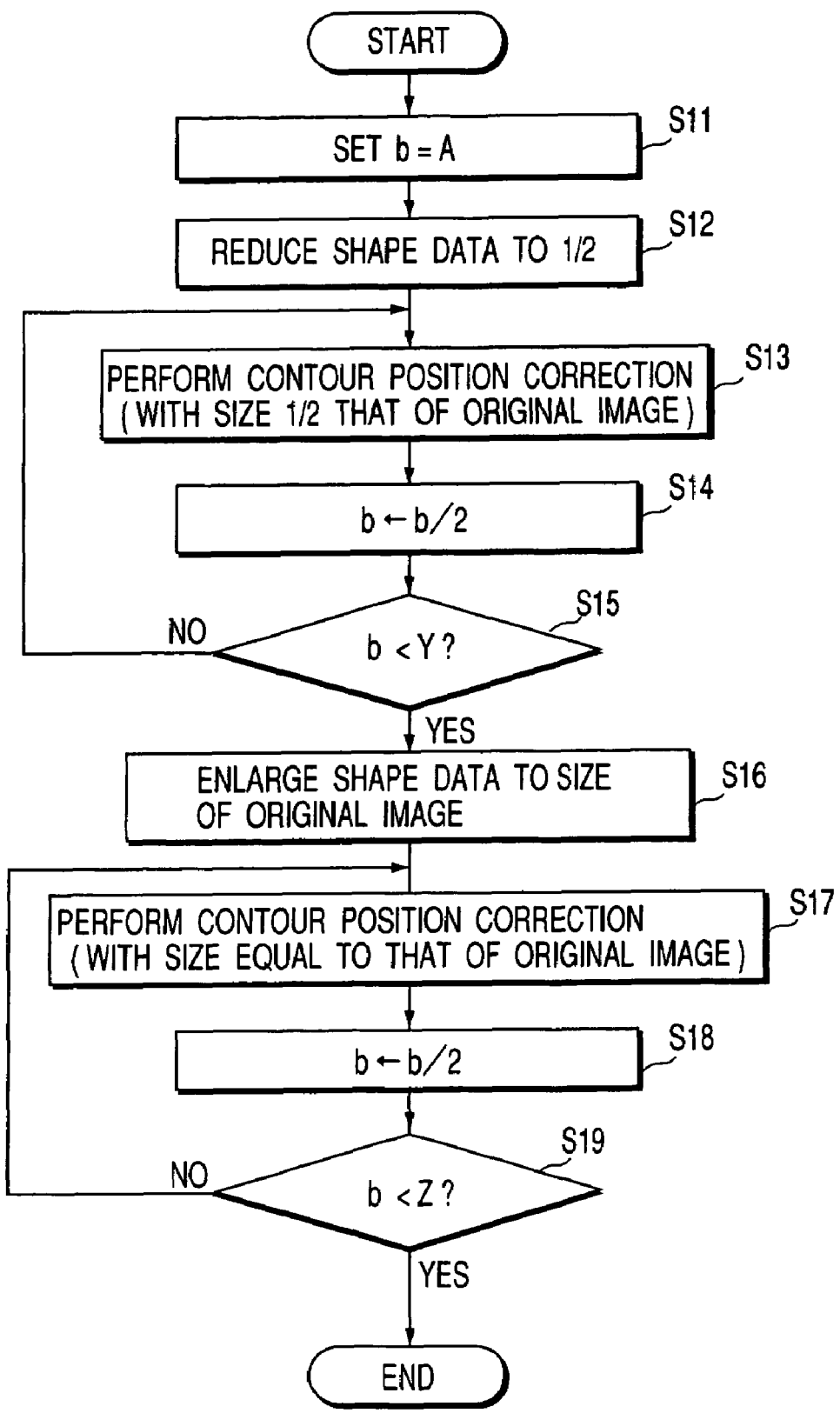
F I G. 1

METHOD OF EXTRACTING CONTOUR OF IMAGE, METHOD OF EXTRACTING OBJECT FROM IMAGE, AND VIDEO TRANSMISSION SYSTEM USING THE SAME METHOD

CROSS-REFERENCE TO RELATED APPLICATIONS

This application is a divisional of U.S. Patent application Ser. No. 09/692,457, filed Oct. 20, 2000, now abandoned which is based upon and claims the benefit of priority from the prior Japanese Patent Applications No. 11-301415, filed Oct. 22, 1999; and No. 2000-099877, filed Mar. 31, 2000, the entire contents of each of which are incorporated herein by reference.

BACKGROUND OF THE INVENTION

The present invention relates to a method of extracting the contour of an object region from an image, a method of extracting an object from an image, and a video transmission system using the object extraction method.

A technique of extracting an object region from an image can be effectively used for a process of replacing the background with another image. In this case, if the region of a to-be-extracted object as a target object is not properly obtained, a high-quality composite image cannot be obtained.

When the rough shape of an object is obtained in advance by some method, a technique is required, which obtains an object region with a higher precision on the basis of the rough shape. As one of such techniques, the present inventors have proposed the technique disclosed in Takashi IDA and Yoko SAMBONSUGI, "Object Contour Fitting Using Self-Affine Mapping", Proceedings of the 5th Symposium on Sensing via Image Information, C-15, pp. 115-120, June 1999). This technique uses self-affine mapping.

According to a technique using this self-affine mapping, the rough shape of a provisionally provided to-be-extracted object, i.e., the contour of provisionally provided shape data, can be matched to the contour of a correct object region. In this technique, however, the computation amount for a similar block search is large, and it is difficult to extract a target image part from an image at a high speed. For this reason, this technique needs to be further improved to be applied to moving images and the like.

BRIEF SUMMARY OF THE INVENTION

It is an object of the present invention to provide an image contour extraction method capable of reducing the processing amount and extracting a target image portion from an image at a high speed.

According to the present invention, there is provided an image contour extraction method comprising the steps of inputting image data and shape data which is a binary image representing a provisional region of an object in the image data, reducing the image data and the shape data, performing coarse contour position correction on the basis of the reduced image data and shape data to coarsely bring a contour of the shape data close to a contour of the image data, and performing main contour position correction to match the contour of the shape data to the contour of the image data on the basis of the image data and the coarsely adjusted shape data obtained by the coarse contour position correction, wherein the coarse contour position correction includes arranging a plurality of search reference blocks, each having a first size, on the contour of reduced shape data, searching, for each of the search reference blocks, the reduced image data for a similar block having a texture similar to that of the search reference block and having a second size larger than the first size, and replacing all the search reference blocks with correction shape data obtained by extracting data of the similar blocks from the reduced shape data and reducing the data to the first size, and the main contour position correction includes arranging a plurality of search reference blocks, each having a third size; searching, for each of the search reference blocks, the input image data for a similar block having a texture similar to that of the search reference block and having a fourth size larger than the third size, and replacing all the search reference blocks with correction shape data obtained by extracting data of the similar blocks from the shape data and reducing the data to the third size.

In the present invention, correction is made by the method which uses self-affine mapping to match provisional shape data (alphamap) to the contour of the contour extraction object. For this purpose, the image data obtained by capturing the contour extraction object and shape data which is a binary image having a provisional contour shape and representing the region of the contour extraction object in the image data are used to arrange a plurality of search reference blocks, each having a predetermined size, on the contour portion of the shape data such that the central positions of the blocks are located on the contour portion and the positions of the respective blocks are shifted from each other. The same image is searched in units of search reference blocks for a similar block having a texture similar to that of the image data in the block and having a block size larger than that of the search reference block. Shape data, of the shape data, which is present in each of the search reference blocks is replaced with correction shape data which is obtained from each of the similar blocks and has undergone size adjustment by reduction processing, thereby correcting the shape data.

The above contour extraction processing is performed a predetermined number of times, and contour extraction processing is performed upon reduction of the image data and shape data at the start of the repetitive execution of the processing. In the contour extraction processing repeated a plurality of number of times, contour extraction is performed upon reduction of the image data and shape data at first. This processing is based on the fact that as the image size of a target is decreased, since the number of pixels corresponding to a contour offset decreases, the contour of the shape data can be brought close to a correct position without increasing the block size of a search reference block much. According to the present invention, therefore, in an initial stage of the contour extraction processing, contour extraction is performed by using reduced image data, together with reduced shape data and reduced search reference blocks.

Since this processing can be performed by using blocks each having a size smaller than that in the prior art, the computation amount is small. As the number of times contour extraction processing is performed increases, contour extraction is performed with the original image size. Shape data can be corrected such that fine details of the contour of the contour extraction object are finally reflected, and hence the contour of the contour extraction object can be extracted with a high precision by using this corrected shape data.

According to the present invention, therefore, there is provided an image contour extraction method which can reduce the amount of contour position correction and extract a target image portion from the image at a high speed.

According to the present invention, there is provided an image contour extraction method comprising the first step of receiving image data obtained by capturing a contour extraction object and shape data which is a binary image having a provisional contour shape representing a region of the contour extraction object in the image data, and setting a plurality of search reference blocks, each having a predetermined size, on a contour portion of the shape data such that central positions of the blocks are located on the contour portion, and positions of the respective blocks are shifted from each other, the second step of searching the same image, in units of search reference blocks, for a similar block having a texture similar to that of the image data in the block and having a block size larger than that of the search reference block, and the third step of replacing shape data, of the shape data, which is present in each of the search reference blocks with correction shape data which is obtained from each of the similar blocks and has undergone size adjustment by reduction processing, thereby correcting the shape data, wherein contour extraction processing of matching a contour line of the shape data to a contour line of the object is performed by repeating the third step a predetermined number of times, and processing in the second step is performed such that a search range for a similar block is limited to a direction perpendicular to a direction of a contour of shape data in a search reference block.

In the present invention, correction is made by the method which uses self-affine mapping to match shape data (alphamap) to the contour of the contour extraction object. For this purpose, the image data obtained by capturing the contour extraction object and shape data which is a binary image having a provisional contour shape and representing the region of the contour extraction object in the image data are used to arrange a plurality of search reference blocks, each having a predetermined size, on the contour portion of the shape data such that the central positions of the blocks are located on the contour portion and the positions of the respective blocks are shifted from each other. The same image is searched in units of search reference blocks for a similar block having a texture similar to that of the image data in the block and having a block size larger than that of the search reference block. Shape data, of the shape data, which is present in each of the search reference blocks is replaced with correction shape data which is obtained from each of the similar blocks and has undergone size adjustment by reduction processing, thereby correcting the shape data.

In the present invention, the processing in the second step, i.e., similar block search processing of searching the same image, in units of search reference blocks, for a similar block having a texture similar to that of the image data in the block and having a block size larger than that of the search reference block, is performed such that the search range for a similar block is limited to a direction perpendicular to the direction of a contour of shape data in a search reference block.

According to the conventional technique, similar block search processing for a given search reference block is executed such that the block size of the search reference block is increased upward, downward, leftward, and rightward within a predetermined range to search for a block exhibiting a similar pixel pattern. In the present invention, the search range for a similar block is limited to a direction perpendicular to the direction of the contour of shape data in a search reference block. This reduces the computation amount.

Obviously, the contour of a contour extraction object is unknown, and hence a specific direction in which the contour of provisional shape data should be moved to be brought close to the contour of the contour extraction object is also unknown at the time of a search for a similar block. It is, however, empirically known that the direction of the contour of shape data almost coincides with the direction of the contour of contour extraction object in most cases. It is therefore rational to make a search in a direction perpendicular to the direction of the contour of shape data.

According to the present invention, therefore, there is provided an image contour extraction method which can reduce the processing amount for contour position correction of shape data (alphamap) and extract a target image portion from an image at a high speed.

Furthermore, there is provided a method of extracting an object from an image, comprising the first step of generating shape data as an image representing a provisional region of a contour extraction object in the image data by comparing the image data obtained by capturing the contour extraction object with another portion of the same image or another image data, and the second step of matching the contour of the shape data to the contour of the contour extraction object.

According to the present invention, an object can be properly extracted without fixing it to a predetermined position.

According to the present invention, there is provided an image contour extraction method comprising the first step of receiving image data obtained by capturing a contour extraction object and shape data which is an image representing a region of the contour extraction object in the image data, and setting a plurality of search reference blocks, each having a predetermined size, on a contour portion of the shape data such that central positions of the blocks are located on the contour portion, and positions of the respective blocks are shifted from each other, the second step of searching the same image, in units of search reference blocks, for a similar block having a texture similar to that of the image data in the block and having a block size larger than that of the search reference block, and the third step of replacing shape data, of the shape data, which is present in each of the search reference blocks with correction shape data which is obtained from each of the similar blocks and has undergone size adjustment by reduction processing, thereby correcting the shape data, the shape data has different pixel values in an object region and a background region which are different from each other, and a pixel value of one of pixels around a sampling point of the shape data is set as a sampling value in reduction processing in the third step.

According to the present invention, there is provided a transmission system comprising a server and a client, which mutually transmit/receive transmission/reception data, wherein the client includes an object extraction section which obtain extracted image data by extracting an object from an image obtained by capturing an contour extraction object, a client transmission section which sends the extracted image data as downstream transmission/reception data to the server without any change or upon compression, a client reception section which receives upstream transmission/reception data sent from the server as the image data without any change if the transmission/reception data is not compressed, and reproduces the image data if the data is compressed, and a display unit which displays the image data, and the server includes a server reception unit which receives the downstream transmission/reception data as the extracted image data if the transmission/reception data is not compressed, and reproduces the extracted image data if the data is compressed, a compositing section which composites the extracted image data into one composite image data, and a server transmission section which transmits the composite image data as the upstream transmission/reception data without any change or upon compression.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a flow chart for explaining an image contour extraction method according to the first embodiment of the present invention;

DETAILED DESCRIPTION OF THE INVENTION

The embodiments of the present invention will be described below with reference to the views of the accompanying drawing. In the present invention, first of all, contour correction processing for correcting shape data to match shape data (alphamap), which is used to extract the contour of a contour extraction object in an image, to the contour of the contour extraction object is repeatedly executed, and contour correction processing is performed at the start of the repetitive execution of the processing while the image data, shape data, and search reference block are reduced.

In the first embodiment, the contour correction processing at the start of the above processing is performed while the image size is reduced, and hence the number of pixels corresponding to a contour offset decreases accordingly. This processing therefore uses the technique of bringing the contour of shape data (alphamap) close to a correct position without increasing the block size of a search reference block much. As described above, since processing can be performed with a search reference block having a smaller block size than in the prior art, the computation amount can be reduced. Lastly, contour correction processing is performed with the original image size, and hence shape data (alphamap) fitted to fine details of the contour can be obtained.

The embodiments of the present invention will be described below with reference to the views of the accompanying drawing.

The basic contents of contour correction processing in the present invention will follow the technique described in the prior art.

Basic Techniques

Figure 5:
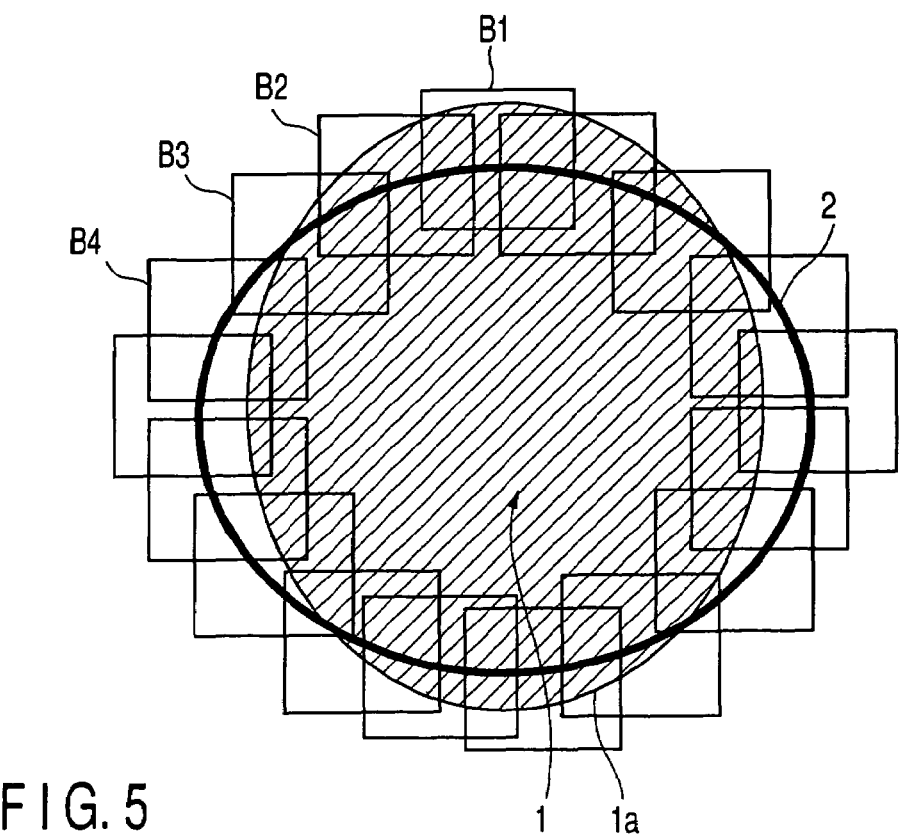
FIG. 5 is a view showing an example of the arrangement of search reference blocks on shape data (alphamap) used in contour position correction based on a technique using self-affine mapping.

The following are basic techniques. Consider a case wherein contour extraction processing is to be performed for an image as a (correct object region) 1 in a frame image (original image) obtained by capturing the object, as shown in FIG. 5.

<Process 1: Setting Rough Shape for To-be-extracted Object>

An operator displays an original image on a display screen and sets a rough shape 2 for an image of an object (correct object region) 1 on the screen. The coordinate position of the frame image (original image) is the same as that of the data of the rough shape 2 of the object. Although they can be displayed in a superimposed state by setting different layers for them, the two data are managed so as not to mix.

For example, the rough shape 2 of the object is a rough outline manually drawn by the operator on the frame image displayed on the screen along the outer shape of the object. This outline is offset from a contour 1a of the object 1.

The self-affine mapping technique is therefore used to perform processing for matching the contour of the rough shape 2 of the object to the contour 1a of the object 1, which is the correct contour of the desired object.

<Process 2: Self-affine Mapping Method>
<Process 2-1: Creation of Shape Data (Alphamap)>

First of all, with respect to the data of the rough shape 2 of the object, "255" is assigned to the pixel value of each pixel inside the rough shape 2 of the object, and "0" is assigned to the pixel value of each pixel outside the rough shape 2. With this processing, shape data (alphamap) is obtained, which is an image (binary image) in which all the pixels inside the rough shape 2 of the object are painted with the pixel values "255", and the entire background is painted with the pixel values "0".

<Process 2-2: Arrangement of Search Reference Blocks>

Search reference blocks B1, B2, . . . , Bn-1, Bn are then arranged along the contour (the rough shape 2 of the object) of the shape data (alphamap).

More specifically, the image is sequentially scanned, starting from the upper left pixel (coordinate position: 0, 0) on the alphamap to the right, from upper lines to lower lines, i.e., the image is X-Y-scanned from a reference coordinate position, to check pixels. If a given pixel differs in pixel value from a neighboring pixel on the left or upper side and is not included in any of the previously set blocks, a block having a predetermined size (block size b) is placed around the given pixel. With this processing, the search reference blocks B1, B2, . . . , Bn-1, Bn respectively having unique position coordinates are arranged, as shown in FIG. 5. In this case, the search reference blocks B1, B2, . . . , Bn are set to be linked together while overlapping one another.

<Process 2-3: Acquisition of Similar blocks>

When the search reference blocks B1, B2, . . . , Bn respectively having unique position coordinates are obtained, they are arranged on the frame image (original image) in accordance with the coordinate positions.

With this processing, at the respective coordinate positions, the respective search reference blocks B1, . . . , Bn specify partial regions, of the object 1, which partly include contour positions of the object (correct object region) 1 within the ranges of their own block sizes. By using these regions, therefore, similar blocks respectively having pixel states similar to those in the respective blocks are obtained.

In this case, a similar block is larger than a corresponding search reference block, and the pixel value of the reduced image data of the similar block becomes almost equal to that of the image data in the search reference block.

A similar block is obtained as follows. Affine candidates are set by trial and error within the range obtained by enlarging the region of a corresponding search reference block, and the degree of similarity between the pixel state (i.e., the texture in the block) of each image in this block range and the pixel state of the intra-block image of the corresponding search reference block is checked by error evaluation. An image exhibiting a minimum error (best evaluation result) is detected and obtained as a similar block.

In this manner, a similar block of the object 1 is obtained for each of the search reference blocks B1, . . . , Bn.

A technique of detecting similar blocks will be described in detail next.

Figure 7:
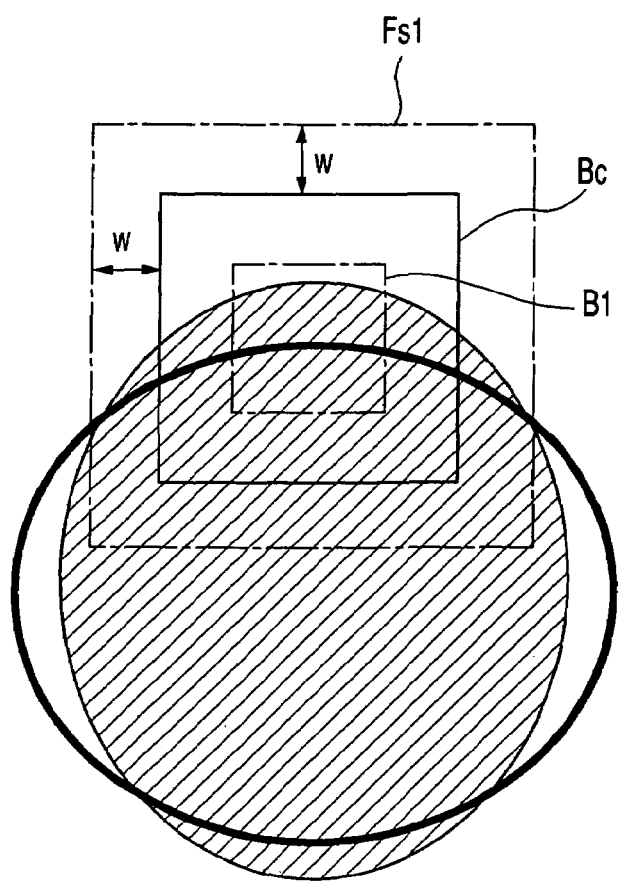
FIG. 7 is a view showing an example of a search range for a similar block used in contour position correction based on the technique using self-affine mapping in the prior art.

For example, in order to detect a similar block of the search reference block B1, a search area Fs1 having a proper size is set around the search reference block B1, as shown in FIG. 7.

Affine candidates Bc are variously set inside the search area Fs1. Every time a similar candidate block is set, the similar candidate block is reduced to the block size of the search reference block B1, and error evaluation is performed to evaluate the similarity between the pixel distribution of the similar candidate block after the reduction processing and that of the search reference block B1. A similar candidate block exhibiting a minimum error (best evaluation result) is determined as a similar block Bcd.

In the case shown in FIG. 7, error evaluation is performed with respect to the pixel distribution of the search reference block B1 by using new similar candidate blocks obtained by shifting the similar candidate block Bc as a reference, which is twice as large as the search reference block B1 in the vertical and horizontal directions and has the same central coordinate position as that thereof, in units of pixels upward, downward, leftward, and rightward within the range of W pixels.

Figure 6:
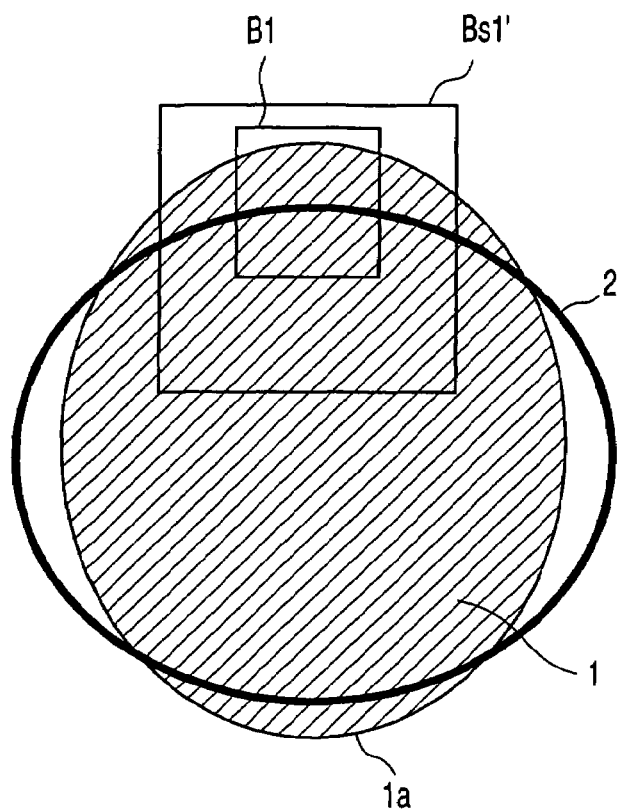
FIG. 6 is a view showing an example of a search reference block and similar block used in contour position correction based on the technique using self-affine mapping.

Although FIG. 6 shows only a similar block Bs1 of the search reference block B1, final similar blocks Bcd1, . . . , Bcdn are obtained for all the search reference blocks B1, . . . , Bn shown in FIG. 5.

<Process 2-4: Contour Position Correction>

When the similar blocks Bcd1, . . . , Bcdn are obtained for the respective search reference blocks B1, . . . , Bn, the shape data (alphamap) is processed such that the data in the respective search reference blocks B1, . . . , Bn are replaced with shape data (alphamap) for correction. This shape data (alphamap) for correction is data cut from the shape data (alphamap) with the similar blocks Bcd1, . . . , Bcdn corresponding to the respective search reference blocks and reduced to the block size of each search reference block.

Figure 8:
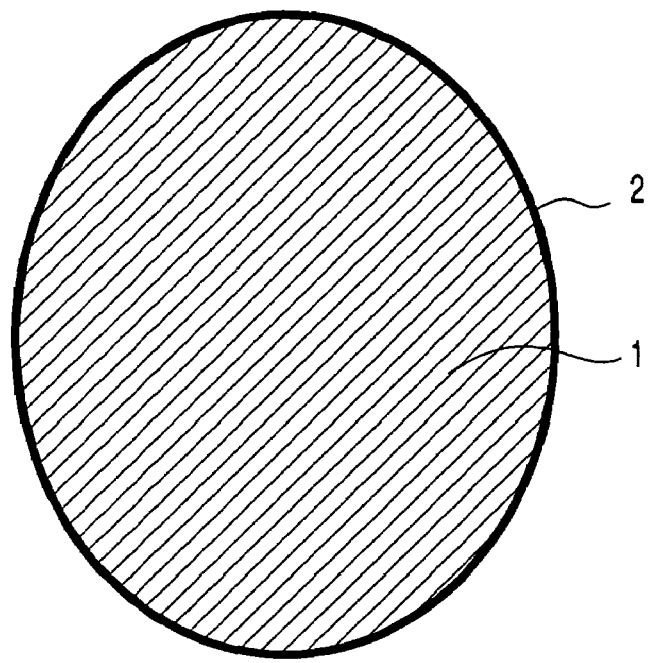
FIG. 8 is a view showing the correction result of shape data (alphamap) in contour position correction based on the technique using self-affine mapping.

When this processing is performed once for each of all the search reference blocks B1, . . . , Bn, the contour of the shape data (the rough shape 2 of the object) approaches the contour 1a of the correct object region 1. When such replacement is recursively repeated, the contour of the shape data (the rough shape 2 of the object) almost converges to the contour 1a of the correct object region, as shown in FIG. 8.

With this processing, the contour of the shape data (alphamap) can be matched to the contour of the correct object region 1 up to its fine details.

In this technique, however, the condition that "when the search reference blocks B1, . . . , Bn are arranged on the frame image (original image), the respective search reference blocks B1, . . . , Bn include contour line segments of the correct object region 1" must be satisfied. If, therefore, the search reference blocks B1, . . . , Bn are greatly offset from the contour line of the correct object region 1, the above processing is performed by using large blocks to bring the contour of the shape-data (the rough shape 2 of the object) close to the contour 1a of the correct object region 1, thus satisfying the required condition. The above processing is then recursively performed with small blocks to finally match the contour of the shape data to the contour of the correct object region 1.

The contour of the corrected shape data (alphamap) obtained by this processing can be matched to the contour 1a of the contour extraction object up to its fine details. With this processing, even if the contour offset is large, a contour can be extracted with high precision.

The above processing is contour position correction for shape data (alphamap). In the present invention, the basic contents of the processing follow those of a conventional self-affine mapping method. In the present invention, however, to reduce the arithmetic processing load, the block size of each search reference block used for contour position correction is set to be smaller than that in the conventional technique. This technique will be described in detail below.

First Embodiment

Figure 9:
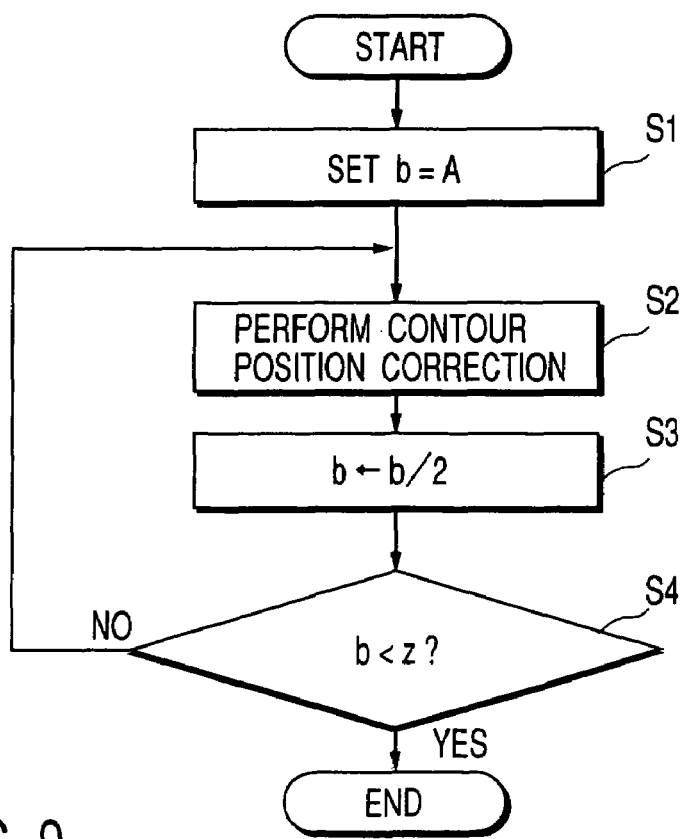
FIG. 9 is a flow chart showing the contents of contour position correction based on the technique using self-affine mapping in the prior art.

In the conventional technique, as shown in FIG. 9, shape data (alphamap), an original image (the frame image obtained by capturing an object), and each search reference block are used without changing their sizes (without any reduction). In contrast to this, in the present invention, to reduce the arithmetic processing load, processing proceeds with their sizes being reduced to half in the vertical and horizontal directions.

More specifically, assuming that the block size of one side of a search reference block is represented by b, b=A. The contour position correction described with reference to FIGS. 5 to 8 is performed by using search reference blocks each having the block size b=A, an original image (the frame image-obtained by capturing an object), and shape data (alphamap) without changing their sizes. The block size b=A is then reduced to half. If the block size b is smaller than Z (<A), the processing is terminated. Otherwise, the block size is further reduced to half, and the contour position correction is repeated. With this processing, a contour can be extracted with high precision even if the contour offset is large.

In contrast to this, contour position correction is performed in two stages, i.e., a coarse adjustment stage and a main adjustment stage. The contour position correction in the coarse adjustment stage is performed by using data obtained by reducing provisional shape data (alphamap) to ½ vertically and horizontally and an image obtained by reducing an original image to ½ vertically and horizontally, together with search reference blocks each having a block size reduced to b/2. This makes it possible to reduce the arithmetic processing load.

FIG. 1 is a flow chart showing an embodiment of the present invention. The present invention will be described below with reference to this flow chart. According to the present invention, in the first stage, contour position correction is performed after shape data (alphamap), an original image, and search reference blocks are reduced in size. With this processing, the provisional shape data (alphamap) is made similar to the shape of the correct contour of the object (coarse adjustment stage) first, and then contour position correction is performed by using the coarsely adjusted shape data (alphamap) and original image in their original sizes and the search reference blocks in the reduced size, which are used in the coarse adjustment stage, in order to fit the coarsely adjusted provisional shape data (alphamap) to the shape of the correct contour of the object. In this manner, contour extraction processing can be executed while the computation amount is greatly reduced.

The gist of the present invention will be described next.

When shape data (alphamap) in the first stage, i.e., provisional shape data (provisional alphamap), is obtained, the block size of each search reference block is determined through the following steps in the coarse adjustment stage before the processing of "arranging the search reference blocks B1, B2, ..., Bn-1, Bn along the contour of the shape data (alphamap) (the rough shape 2 of the object)" which is the processing in <process 2-2> described above.

Step S11: As in the existing technique, the initial value of the block size b of each search reference block is set to A.

Step S12: The provisional shape data (provisional alphamap) which is shape data (alphamap) in the first state is reduced to ½ vertically and horizontally. This reduction is performed by decimating or subsampling the provisional shape data (provisional alphamap) as source data every other pixel or performing filter processing using a majority filter based on four pixels close to each sampling point.

Step S13: The frame image (original image) is reduced to ½ vertically and horizontally, and the block size of each search reference block is also reduced to ½ vertically and horizontally.

Contour position correction after <Process 2-2> described above is performed by using the frame image (original image), search reference blocks, and shape data (alphamap) which have undergone this reduction processing.

Step S14: The block size of each search reference block used in the above contour position correction is further reduced to ½ vertically and horizontally.

Step S15: It is checked whether the block size b of each search reference block which has been reduced in step S14 is smaller than Y. Y is a preset desired value, and Y<A. If it is determined upon comparison between the magnitude of b and that of Y that b is smaller than Y, the flow advances to step S16. Otherwise, the flow returns to step S13. This processing is performed to prevent the block size of each search reference block used in the contour position correction in the coarse adjustment stage from being excessively reduced to excessively reduce the image included in each search reference block.

By repeating this processing until the block size reaches a predetermined size, the provisional shape data (provisional alphamap) can be coarsely made similar to the correct contour of the object (coarse adjustment stage).

If it is determined upon comparison between the magnitude of b and that of Y that b is smaller than Y, the coarse adjustment stage is terminated, and the main adjustment stage is started. The main adjustment stage corresponds to the processing in step S16 and the subsequent steps.

Step S16: In the main adjustment stage, first of all, the reduced shape data (alphamap) used in the coarse adjustment stage is restored to the original size. More specifically, the coarsely adjusted shape data (coarsely adjusted alphamap), which is the shape data (alphamap) coarsely adjusted in the coarsely adjustment stage, is enlarged twice vertically and horizontally. With this processing, the data size becomes equal to the size of the original image.

Step S17: Contour position correction is performed by using the original image having the original size, the search reference blocks each having the block size b and used in the last processing in the coarse adjustment stage and the coarsely adjusted shape data (coarsely adjusted alphamap) whose size has been restored to the original size.

Step S18: The block size b of each search reference block is reduced to ½.

Step S19: It is checked whether the block size b of each search reference block is smaller than the Z. Z is a preset desired value, and Z<Y. If it is determined upon comparison between the magnitude of b and that of Z that b is smaller than Z, the processing is terminated. If b is larger than Z, the flow returns to the processing in step S17.

This processing is performed to prevent the block size of each search reference block used in contour position correction in the main adjustment stage from being excessively reduced to excessively reduce the image in each search reference block. As the size of each search reference block gradually decreases, the contour can be fitted to even fine recesses/projections.

By repeating this processing until the size of each search reference block reaches a predetermined size in this manner, the shape data (alphamap) can be finely made similar to the correct contour of the object.

Contour Position Correction Flow

Figure 2:
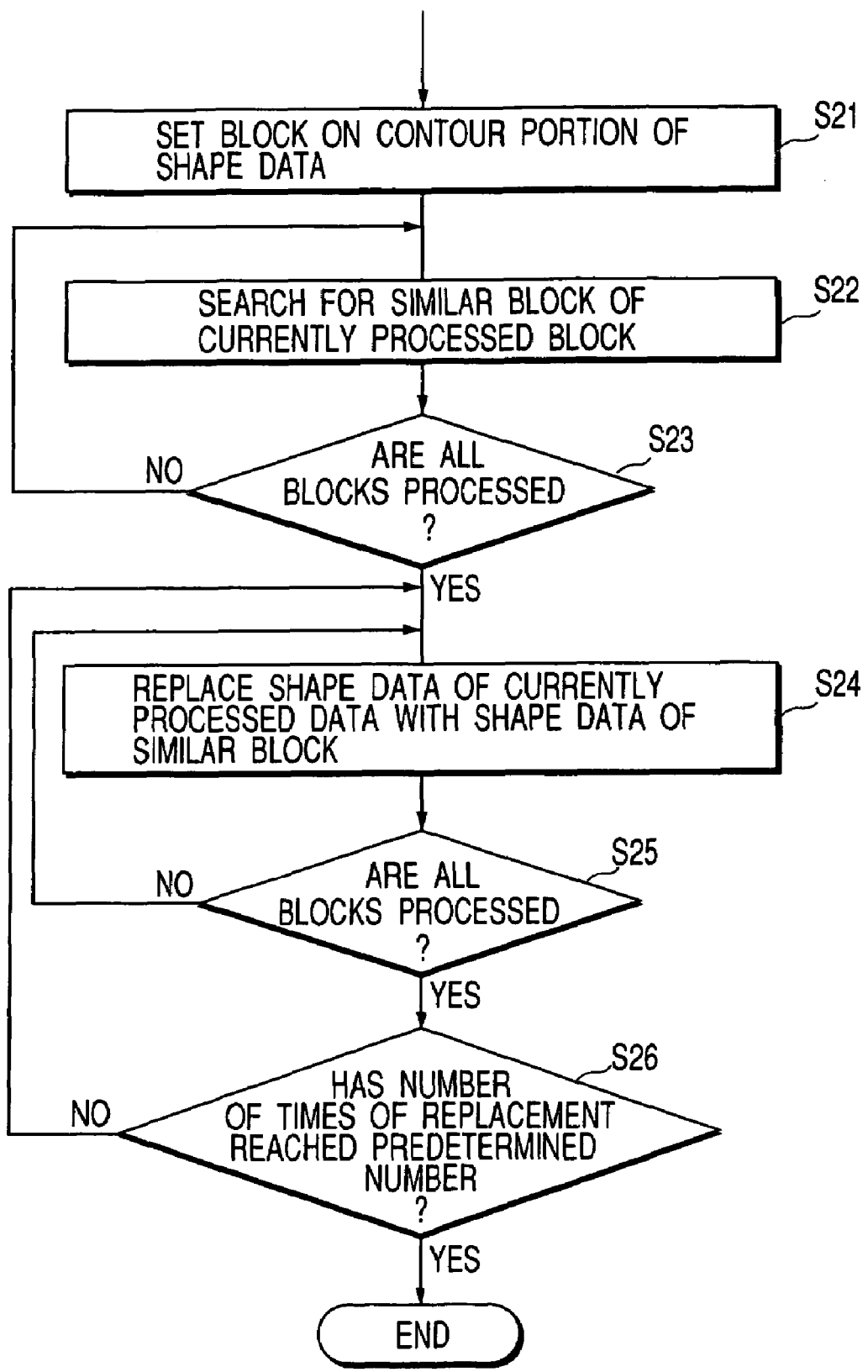
FIG. 2 is a flow chart showing the details of the contents of contour position correction in steps S13 and S17 in FIG. 1.

FIG. 2 is a flow chart showing the details of the contour position correction in steps S13 and S17. Note that the processing in step S13 is performed with an image size of ½ that of the original image, and the processing in step S17 is performed with the same image size as that of the original image.

Step S21: Blocks are set on the contour portion of the provisional shape data (provisional alphamap), as shown in FIG. 5. Assume that the block size in step S13 is set such that the size of on side of each search reference block is b/2, and the block size in step S17 is set such that the size of one side of each search reference block is b.

Step S22: Similar blocks for the respective search reference blocks are obtained by using image data.

Step S23: When similar blocks are obtained for all the search reference blocks set in the step S21, the flow advances to step S24. Otherwise, the flow returns to step S22 to obtain a similar block for another search reference block.

Step S24: The shape data of each search reference block is replaced with the reduced shape data of a corresponding similar block.

Step S25: When all the search reference blocks are completely replaced, the flow advances to step S26. Otherwise, the flow returns to step S24 to replace another search reference block with reduced data.

Step S26: If the number of times of replacement reaches a predetermined number, the processing is terminated. Otherwise, the flow returns to step S24.

In the present invention, if, for example, the size of a frame image (original image) is given by 320×240 (pixels), A=32, Y=16, and Z=4, this contour position correction is performed in the manner indicated by the following table. Note that these values of A, Y, and Z are appropriately set. A represents the original size. Y is used as a threshold for determining the discontinuance of contour position correction as coarse adjustment in the coarse adjustment stage. Z is used as a threshold for determining the discontinuance of contour position correction in the main adjustment stage.

TABLE

| Number of Times | B | Image Size | Block Size |
|---|---|---|---|
| i | 32 | 160 × 120 | 16 |
| ii | 16 | 160 × 120 | 8 |
| iii | 8 | 320 × 240 | 8 |
| iv | 4 | 320 × 240 | 4 |

More specifically, assuming that original block size b=A of each search reference block is "32", in the coarse adjustment stage, a frame image (original image) having a "320×240 pixels" configuration is reduced to ½ in size and used as a frame image having a "160×120 pixels" configuration in the first process (i in the table). In this case, each search reference block has a block size of 16 (vertical)×16 (horizontal) pixels. When the first process is completed, b is "32". This size is reduced to ½ to obtain "16", which is then compared with the value of Y. Since this value "16" is not smaller than the value of Y, which is set to "16", the second (ii in the table) process is started in the coarse adjustment stage. In the second process in the coarse adjustment stage, the reduced frame image (original image) having the "160×120 pixels" configuration, which is ½ the size of the frame image (original image) having the "320×240 pixels" configuration, is used as in the first process. In this case, each search reference block has a block size of 8 (vertical)×8 (horizontal) pixels, which is ½ the size in the first process.

When this second process is completed, b is "16". This size is reduced to ½ to obtain "8", which is then compared with the value of Y. Since the value "8" is smaller than the value of Y which is set to "16", the coarse adjustment stage is completed, and the main adjustment stage is started.

In the main adjustment stage, b takes the value set in the final process in the coarse adjustment stage, and the size of each search reference block also takes the value set in the final process in the coarse adjustment stage. However, the frame image (original image) takes the original size. That is, in this case, the frame image (original image) having the "320×240 pixels" configuration is used, the size of each search reference block is set to "8", and b is set to "8".

In the main adjustment stage, the full-size frame image (original image) having the "320×240 pixels" configuration is used in every process. In the first process (iii in the table) in the main adjustment stage, each search reference block has a block size of 8 (vertical)×8 (horizontal) pixels. When this first process (iii in the table) is completed, b is "8". This size is reduced to ½ to obtain "4", which is then compared with the value of Z. Since this value "4" is not smaller than the value of Z which is set to "4", the second (iv in the table) process in the main adjustment stage is started. In the second (iv in the table) in the main adjustment stage, the full-size frame image (original image) having the "320×240 pixels" configuration is used as in the first (iii in the table) process in the main adjustment stage. In this case, each search reference block has a block size of 4 (vertical)×4 (horizontal) pixels, which is ½ the size in the first process in the main adjustment stage.

When this second (iv in the table) process is completed, b is "4". This size is reduced to ½ to obtain "2", which is then compared with the value of Z. Since the value "2" is smaller than the value of Z which is set to "8", the termination condition for the main adjustment stage is satisfied. Hence, the main adjustment stage is terminated, and the processing is completed.

As described above, according to the present invention, if the size of a frame image (original image) is 320×240 pixels, A=32, Y=16, and Z=4, contour position correction is completed by performing adjustment processing a total of four times, i.e., twice for coarse adjustment processing and twice for main adjustment processing. In the coarse adjustment stage, the number of pixels used for arithmetic operation is reduced to half every time adjustment processing is performed. In the main adjustment stage, although the frame image (original image) and shape data (alphamap) are restored to the full-size data, the size of each search reference block is reduced to ½ from the coarse adjustment stage every time adjustment processing is performed. Therefore, the total arithmetic processing load is greatly reduced. The reason why the size of each search reference block can be continuously reduced to ½ for every adjustment processing from the coarse adjustment stage is that the shape data (alphamap) can be made to almost similar to the contour of the object in the coarse adjustment stage.

There is therefore provided a contour extraction method, in which when contour extraction is to be performed by using the technique using self-affine mapping, the rough shape of an object provided first can be matched to the contour of contour extraction object by a small amount of arithmetic processing, and the contour of provisionally provided shape data can be quickly matched to the contour of the contour extraction object.

Note that in the above example, the block size b of each search reference block need not always be reduced to ½ at time. For example, the block size may be reduced to "32", "8", and "4". This makes it possible to further reduce the processing amount.

In the above case, contour position correction for shape data (alphamap) is executed in two stages, i.e., the coarse adjustment stage and main adjustment stage, and the reduced original image, reduced search reference blocks, and reduced shape data (alphamap) are used in the coarse adjustment stage. Contour position correction is executed upon further reduction in size as compared with the preceding contour position correction until the reduced block size satisfies a predetermined condition. When the block size satisfies the predetermined condition, the main adjustment stage is started. In this main adjustment stage, the original image and shape data (alphamap) having the original sizes are used. As each search reference block, a block having the same size as that used in the final process in the coarse adjustment stage is used. Subsequently, contour position correction is executed by using search reference blocks each obtained by reducing the size of each search reference block used in the preceding process until the block size satisfies a predetermined condition. With this processing, the shape of desired shape data (alphamap) can be matched to the contour shape of the object.

In this contour position correction, in searching for a similar block, a similar candidate block is gradually enlarged upward, downward, leftward, and rightward with respect to a search reference block to search an appropriate block. However, a similar block can be detected more efficiently by enlarging a similar candidate block along the direction in which the contour of the shape data in a search reference block is present instead of always enlarging the similar block upward, downward, leftward, and rightward. An example of this case will be described below as the second embodiment.

Second Embodiment

An embodiment in which the similar block search ranges are switched in accordance with the direction of the contour of the shape data in a search reference block will be described.

As described with reference to FIG. 7, in the prior art, a similar block search range is determined by the position relative to a search reference block, but is not controlled by the position on the screen, shape data, and image data.

Figure 3:
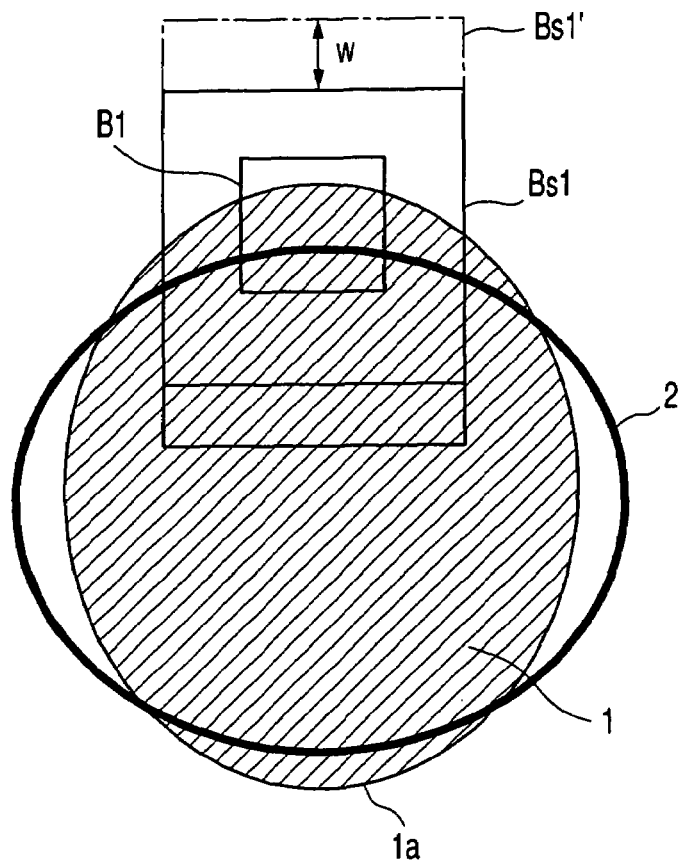
FIG. 3 is a view for explaining an example of a search range for similar blocks in the second embodiment of the present invention.

Assume that the contour of shape data crosses the inside of a search reference block like the search reference block B1 in FIG. 3. In this case, even if a search is made within a range Bs1' obtained by expanding the similar block by W pixels vertically without expanding it horizontally, the expansion performance hardly deteriorates.

This is because, in the case of a similar block Bs1, an effect of correction can be obtained only by moving the contour of shape data vertically in replacement processing. In this case, the contour of the shape data is moved vertically to select a similar block shifted vertically.

In some case, owing to the influences of the background or fine details of an object, when the contour of shape data is shifted horizontally, an error is minimized. However, even if the error is slightly larger than that in the above case, the contour of the shape data can be brought closer to the correct contour by moving it vertically than by moving it horizontally.

Obviously, a contour 1a of a contour extraction object (correct object region) 1 is unknown, and the specific direction in which the contour of provisional shape data (a rough shape 2 of an object) should be moved to bring it close to the contour 1a of a contour extraction object (correct object region 1) cannot be known at the time of a search for a similar block. Since it is empirically known that the direction of the contour of shape data (the rough shape 2 of an object) almost coincides with the direction of the contour 1a of the contour extraction object (correct object region) 1 in most cases, it is most rational to move a similar candidate block in a direction perpendicular to the direction of the contour of the shape data (the rough shape 2 of the object).

For example, the values of four pixels of a block of shape data, i.e., upper left, upper right, lower left, and lower right pixels, are compared with each other. If the value of the upper left pixel is equal to that of the upper right pixel, and the value of the lower left pixel is equal to that of the lower right pixel, a contour extending horizontally is determined. The similar candidate range is then moved in the vertical direction alone to search for a similar block.

Likewise, if the value of the upper left pixel is equal to that of the lower left pixel, and the value of the upper right pixel is equal to that of the lower right pixel, a contour extending vertically is determined. In this case, the similar candidate block is changed horizontally to search for a similar block.

In a case corresponding to neither of the above cases, a search for a similar block is made in all directions as in the conventional method.

With this processing, the processing amount in searching for similar blocks can be reduced without any deterioration in extraction precision.

In this case, a search for a similar block may be performed as follows. In performing error evaluation while sequentially switching similar candidate blocks, when a given similar candidate block exhibiting an error smaller than a predetermined allowable error is found, the search is stopped to determine the given similar candidate block as a similar block instead of determining a similar candidate block exhibiting a minimum error within the search range as a similar block.

With this processing, the processing amount can be further reduced without any deterioration in extraction procession.

In some case, a search can be effectively made by switching the search ranges in accordance with the position of a block in the screen. For example, as proposed in "Image Contour Extraction Apparatus" in Japanese Patent Application No. 11-186537, assuming that an object is an image portion of the face of a user, including his/her head portion, a contour line image of a human head portion is prepared in advance, and the contour line image of the head portion is displayed on the screen. In addition, the head portion of the user is positioned inside a frame as the contour line image of the head portion displayed on the screen and captured. The head portion is extracted from the image along the contour by using the frame as the initial state of shape data (provisional data (provisional alphamap)). If the user always aligns the position of his/her chin with the lowermost line of the frame in a case to which this technique is applied, the offset from the frame at the chip portion becomes smaller than the offsets at other portions.

In this case, the erroneous extraction probability can be decreased by omitting processing with a large block size at the lower portion of the contour. Alternatively, the erroneous extraction probability can be decreased by narrowing the search range. Omitting processing with a large block size or narrowing the search range will lead to a reduction in processing amount. In addition, if an initial shape is known as in the above case, since the arrangement of search reference blocks is uniquely determined, the arrangement may be stored. In step S21, in which search reference blocks are arranged, the stored arrangement is simply read out. This makes it possible to omit the processing of detecting the contour of the shape data.

In addition, the amount of search processing can be greatly reduced by obtaining similar blocks intermittently, e.g., alternately, and regarding similar blocks between the obtained similar blocks as blocks located therebetween, instead of obtaining similar blocks for all the search reference blocks B1, ..., Bn which are linked together as shown in FIG. 5.

A method of separately arranging search reference blocks is also available. As is obvious, with this method, since the total number of search reference blocks is reduced, the processing amount is reduced.

The overall processing amount can also be reduced by using a method of preparing an image obtained by reducing the overall frame in advance, extracting a portion corresponding to a set similar candidate block from the reduced image, and comparing the extracted portion with the image in each search reference block. By using this method, the overall processing amount can be reduced.

Figure 4:
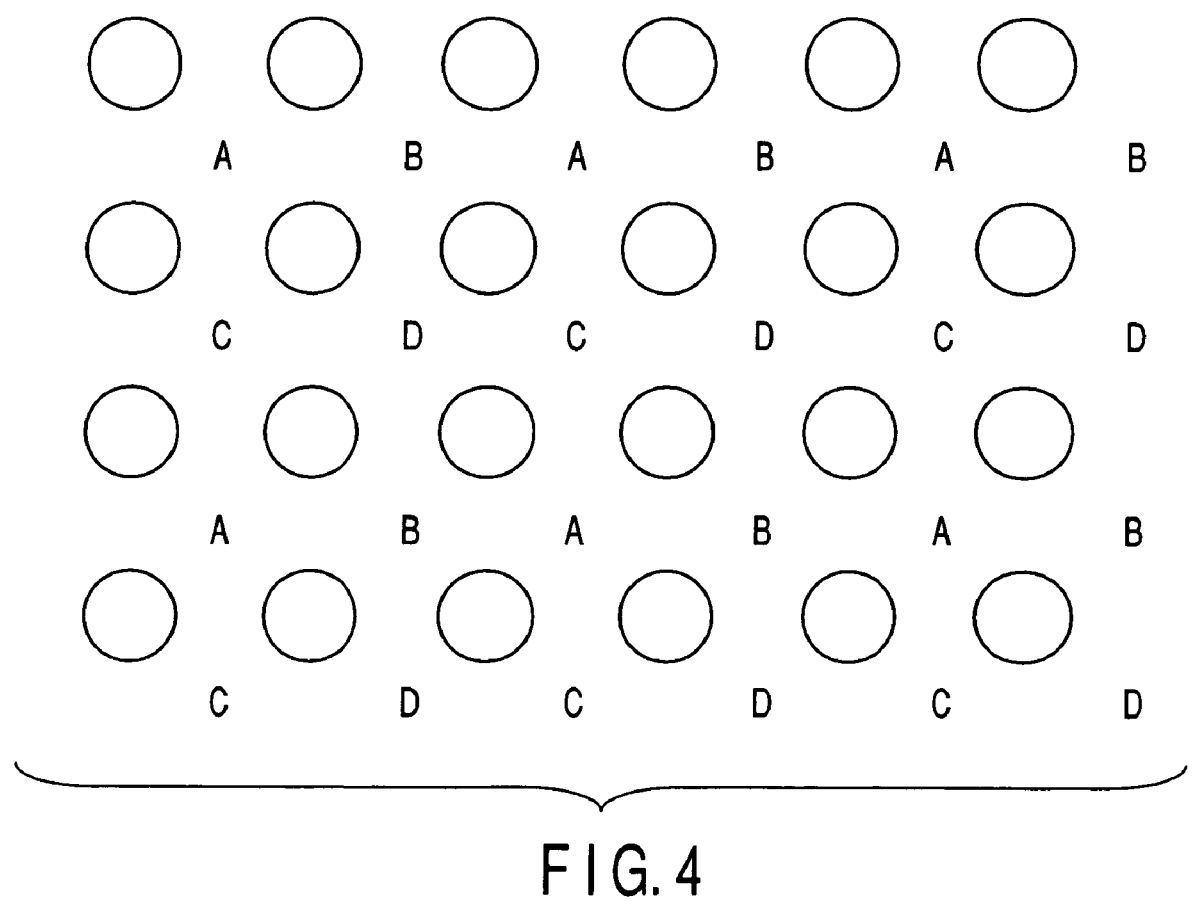
FIG. 4 is a view for explaining a sampling position for a reduced frame in the second embodiment of the present invention.

For example, in a case wherein the ratio of the size of a search reference block to the size of a similar block is 1:2, and similar candidate blocks are set to be shifted from each other by one pixel, with respect to the pixel positions of original images denoted by reference symbols A, B, C, and D indicated by circles in FIG. 4, a reduced frame having a size ½ that of the original image in the vertical and horizontal direction is generated by using the pixels sampled at the pixel position of A. In addition, reduced frames are formed with the sampling point being shifted to pixel positions of points B, C, and D, i.e., the phases being shifted. With this processing, a total of four reduced frames are generated. In this case, if a search is to be made while the position of each similar candidate block is set to even X- and Y-coordinate values, i.e., the position is shifted by two pixels each time within the search range, it suffices if only one of reduced frames at A, B, C, and D is generated in advance. In this case, the processing of generating three other images can be omitted.

If the sampling point is shifted by two pixels each time instead of one pixel, the number of similar candidate blocks for searches for similar blocks decreases, and the search processing amount decreases accordingly. With the method using a reduced frame, the amount of processing of generating a reduced frame can be greatly reduced.

If initial shape data is small, there is no need to generate an entire reduced frame. If a portion that is not included in a similar block search range is known in advance, the processing of generating a reduced frame at that portion may be omitted.

The generation of reduced frames in similar block search processing has been described above. Likewise, when an image of a found similar block is to be replaced/converted on shape data (alphamap) as well, a reduced shape frame can be generated first, and then the shape data of each search reference block can be extracted from the reduced shape frame to be replaced.

With this processing, reduction processing for each replacement can be omitted, and hence the load of arithmetic processing can be further reduced.

According to the second embodiment, in searching for similar blocks, the search range is limited to a direction perpendicular to the direction of the contour of shape data (alphamap) within a search reference block, thereby efficiently bringing the contour of provisionally provided shape data (alphamap) close to the contour of the contour extraction object. In addition, the computation amount can be greatly reduced. The computation amount can further be reduced by separately arranging search reference blocks on the contour of shape data (alphamap). Moreover, the total computation amount can be reduced by preparing an image obtained by reducing the overall frame, extracting a portion corresponding to a set similar candidate block from the reduced image, and comparing it with an image in the search reference block instead of performing reduction processing every time a similar candidate block is set.

When the region of an object to be captured is to be extracted from an image, the user manually draws a rough shape of the object. Alternatively, the user obtains the rough shape data of the object by aligning his/her head portion with a displayed contour line, and the contour of the shape data is corrected to the position of the contour of the object within the image data. Accurate extraction can be performed by these methods in most situations. In this case, shape data representing an elliptic region in the center of the frame is generated, and the user aligns his/her head portion with the contour line of the elliptic region displayed on the screen to approximate the elliptic shape data to the head portion well enough to extract the region of the head portion in the next step. The elliptic shape data is regarded as initial shape data, and the position of the contour of the shape data is corrected to the position of the contour of the head portion within the image data.

It is, however, inconvenient for the user to fix his/her head portion by himself/herself at a predetermined position in an image so as to obtain initial shape data. It is desired that initial shape data be automatically obtained when extraction of an object is relatively easy, e.g., the background is relatively flat or the background has no motion.

An embodiment that meets this requirement will be described below.

Third Embodiment

Figure 10:
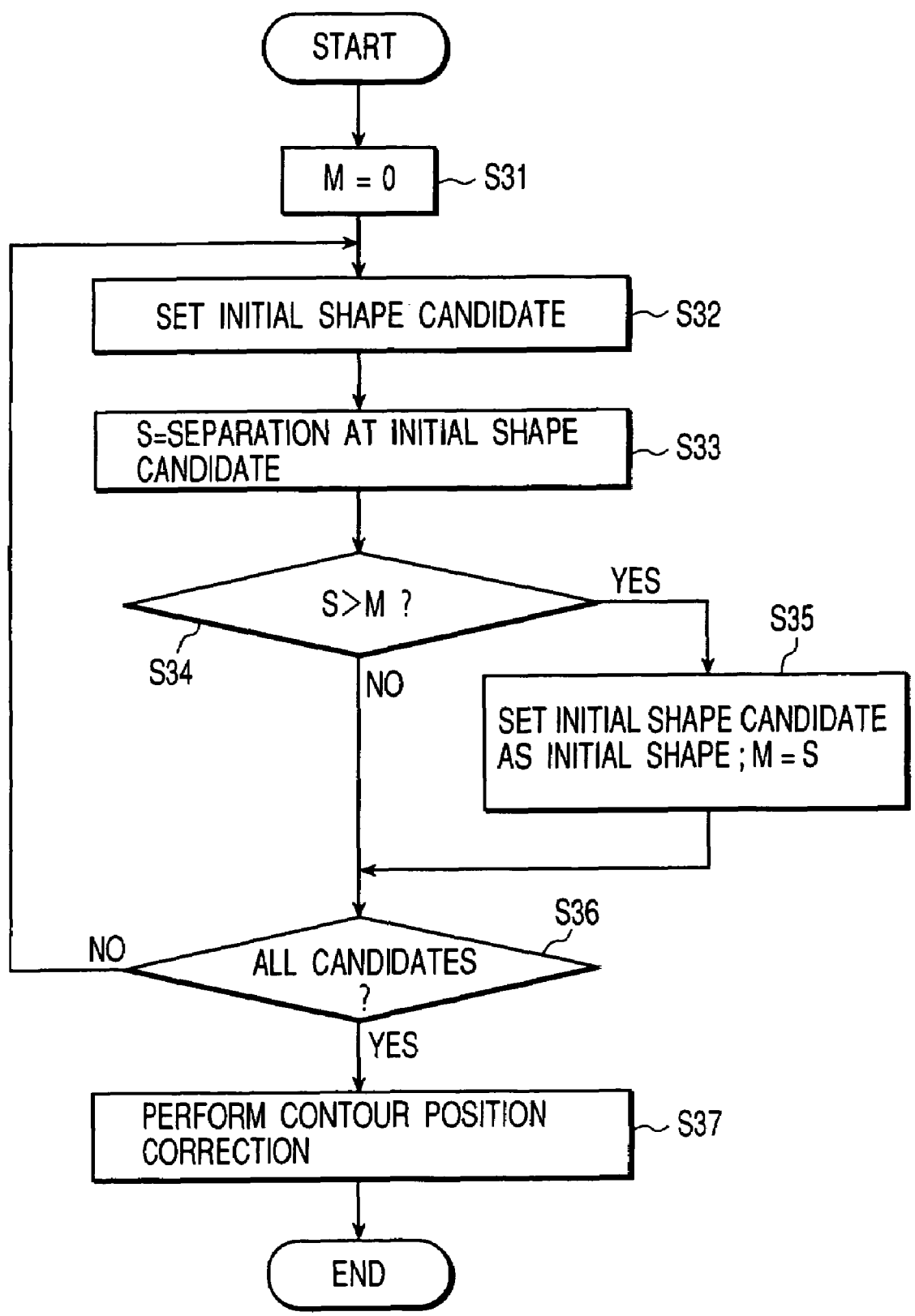
FIG. 10 is a flow chart for explaining an image contour extraction method according to the third embodiment of the present invention.

FIG. 10 is a flow chart for explaining a method of extracting an object from an image according to the third embodiment. In this embodiment, a statistical index termed separability is used. A separability S is expressed by the following equations (Fukui, "Object Contour Extraction Based on Separability between Regions", PROCEEDINGS OF THE IEICE, D-II, Vol. J80-D-II, No. 6, pp. 1406-1414, 1997):

$$S = X/Y$$

$$X = Nb*(Ab-A)*(Ab-A) + Nf*(Af-A)*(Af-A)$$

where Nb is the number of pixels of a background region, Nf is the number of pixels of an object region, A is the average of all pixels, Ab is the average of the pixel values of the background, Af is the average of the pixel values of the object region, and Y is the sum of the squares of the differences calculated for all pixels in relation to the average A.

As is obvious from the above equations, as the difference between the average value of the object region and that of the background region increases, the separability approaches 1, whereas as the difference between the averages decreases, the separability approaches 0. In general, an object and background differ in their statistical characteristics such as the averages of pixel values. It can therefore be estimated that as the separability increases, a more accurate object region can be obtained.

Figure 11:
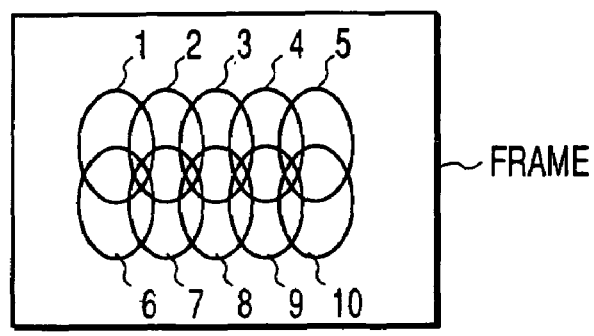
FIG. 11 is a view showing a plurality of initial shape data candidates generated by the third embodiment.

In this embodiment, therefore, the following processing is performed. As candidate regions of shape data, 10 shapes, i.e., shapes 1 to 10, are prepared in advance as shown in FIG. 11, and separabilitys are obtained for the respective shapes. A search is then made for shape data exhibiting a largest value.

This shape data is set as initial shape data. This processing will be described with reference to the flow chart of FIG. 10.

First of all, 0 is assigned to a variable M holding a largest separability (step S31). Initial shape data candidates are sequentially set in ascending order of number (step S32). The separability. S for the current input image data is obtained when the shape data is used (step S33). If S is larger than M, the flow advances to step S35. Otherwise, the flow advances to step S36.

In step S35, the shape data for which the separability is currently obtained is stored as initial shape data. Previous data stored as initial shape data is discarded if it is stored. In addition, M=S is set.

It is checked whether processing for all initial shape data candidates is complete (step S36). If the processing is complete, the flow advances to step S17. Otherwise, the flow returns to step S32. In step S37, the contour line of the shape data is matched to the contour line of the object in the image data by using the initial shape data and current input image data.

Figure 12:
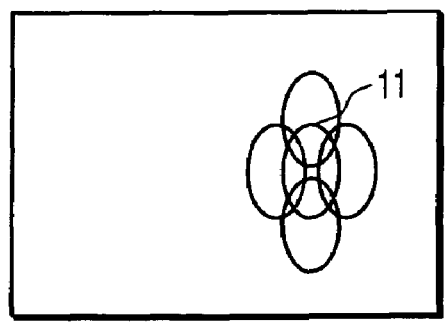
FIG. 12 is a view showing other initial shape data candidates.

If it is known in advance that the motion of an object is relatively slow, the processing amount can be reduced by storing initial shape data candidates selected in units of frames in advance, an making a search only close to the initial shape data selected in the previous frame instead of always searching the entire screen for initial shape data. Assume that shape 11 in FIG. 12 is selected in the previous frame. In this case, as shown in FIG. 12, if a search for shape data is made by using five shapes including upper, lower, left, and right shapes, the processing amount can be reduced to half that in search processing using 10 shapes. Alternatively, if 10 shape data candidates are set by gradually shifting shapes close to shape 11, more accurate initial shape data can be obtained with the same processing amount. When the head portion of a person is to be extracted by setting a search range for initial shape data around a shape in the previous frame, the search range is set to be wider in the horizontal direction of the screen than in the vertical direction. This is because the head portion swings horizontally at a higher probability than it swings vertically.

Figure 13A:
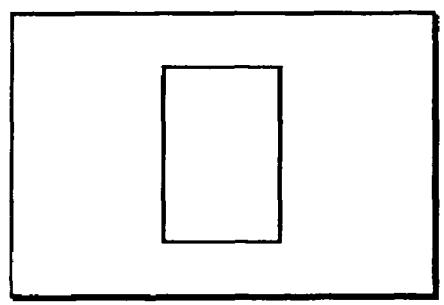
FIGS. 13A, 13B, and 13C are views respectively showing a region for obtaining a separability, initial shape data, and a region for obtaining a separability.
Figure 13B:
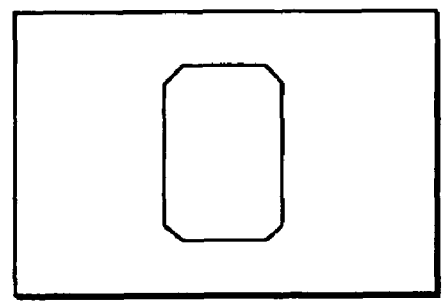

In addition, a region for which a separability is to be obtained need not be perfectly identical to shape data. If a rectangular region can save processing more than an elliptic region, a separability is obtained by using a rectangular region like the one shown in FIG. 13A. The corners of a rectangular region exhibiting a largest separability are then cut to obtain an octagonal region like the one shown in FIG. 13B as initial shape data. The corners are cut to make the region as similar to the head portion of the person as possible.

Figure 13C:
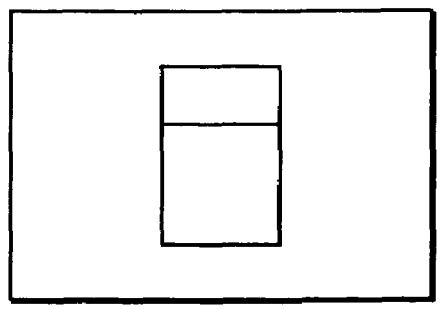

The head portion of the person can be roughly divided into two regions, i.e., the upper, hair region and the face region extending downward from the center. As shown in FIG. 13C, therefore, the rectangular region is divided into two regions, the separability S is obtained by $$S = X/Y$$

$$X = Nb*(Ab-A)*(Ab-A) + Nf1*(Af1-A)*(Af1-A) + Nf2*(Af2-A)*(Af2-A)$$

where Nb is the number of pixels of a background region, Ni1 is the number of pixels of the first object region, Nf2 is the number of pixels of the second object region, A is the average of all pixels, Ab is the average of the pixel values of the background, Af1 is the average of the pixel values of the first object region, Af2 is the average of the pixel values of the second object region, and Y is the sum of the squares of the differences calculated for all pixels in relation to the average A.

With this processing, the head of the person can be detected more accurately in some case.

Figure 14:
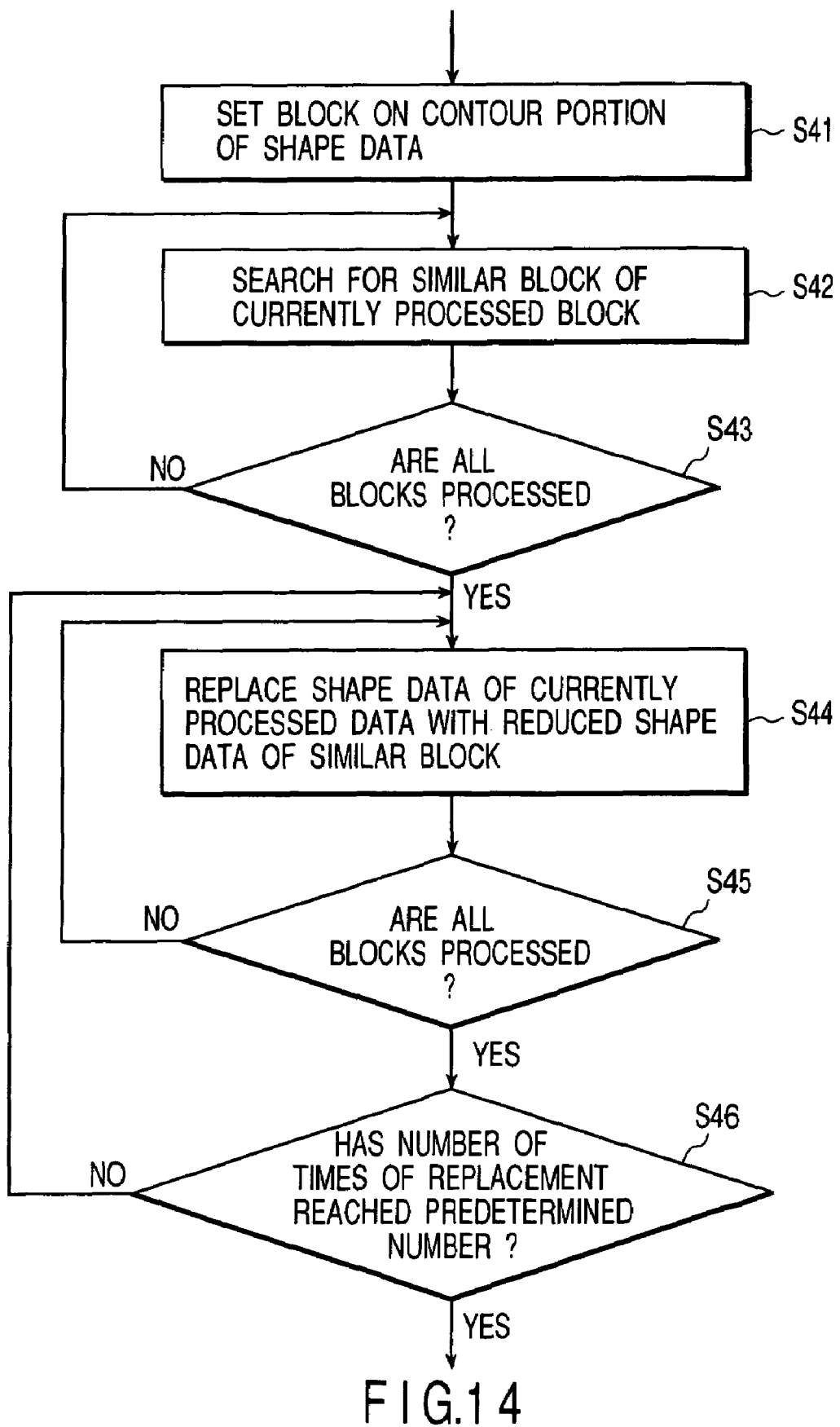
FIG. 14 is a flow chart for explaining contour position correction.

The contour position correction in step S37 is performed in accordance with the flow chart of FIG. 14. First of all, a block is set on a contour portion of shape data (step S41). A similar block is then obtained by using image data (step S42). It is checked whether similar blocks are completely obtained for all the blocks set in step S41 (step S43). If similar blocks are completely obtained, the flow advances to step S44. Otherwise, the flow returns to step S42 to obtain a similar block for another block.

In step S44, the shape data of each block is replaced with the reduced shape data of a corresponding similar block. It is checked whether all the blocks are replaced with reduced shaped data (step S45). If this replacement is complete, the flow advances to step S46. Otherwise, the flow returns to step S44 to replace another block with reduced shape data. If it is determined in step S46 that the number of times of replacement has reached a predetermined number of times, the processing is terminated. Otherwise, the flow returns to step S44.

If an object that is matched to any one of initial shape data candidates is present in the background, the separability for this object may be larger than that for the head portion. If, however, the background is relatively flat, a good initial shape can be obtained by this embodiment regardless of the position of the head portion on the screen.

Fourth Embodiment

Figure 15:
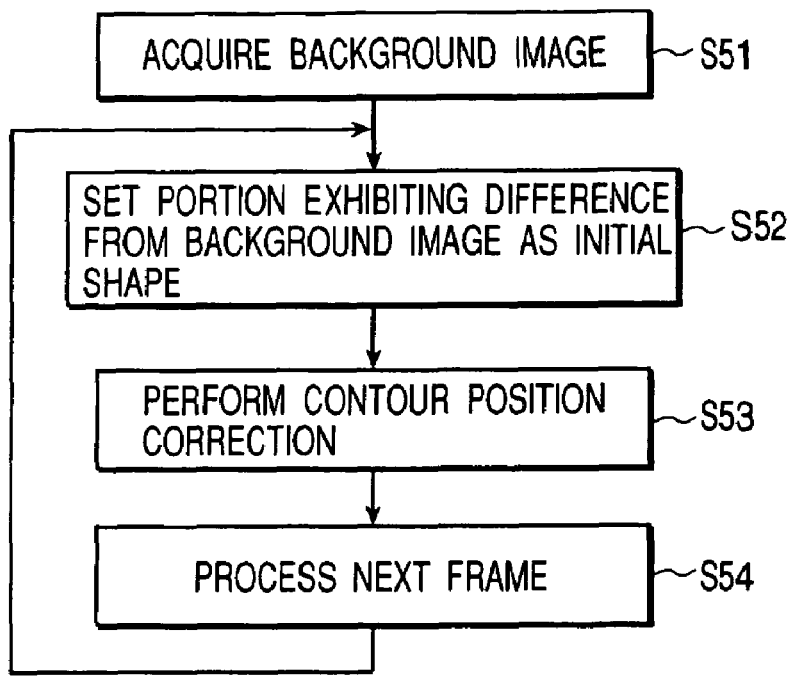
FIG. 15 is a flow chart for explaining an image contour extraction method according to the fourth embodiment of the present invention.
Figure 16A:
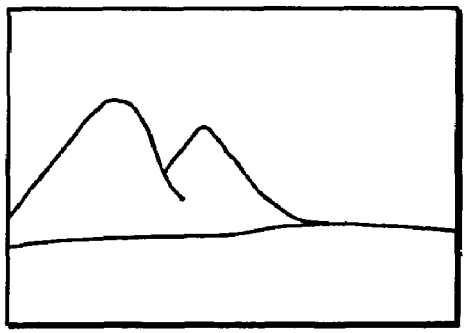
FIGS. 16A, 16B, and 16C are views for explaining an image contour extraction method according to the fourth embodiment of the present invention.

The fourth embodiment will be described next with reference to FIGS. 15 and 16. This embodiment uses a method of generating initial shape data by acquiring a background image before the start of extraction, and then determining, as an object region, a region where the difference between the input image and the background image is equal to or larger than a predetermined value.

Figure 16B:
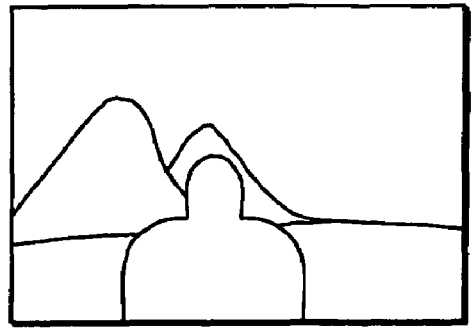
Figure 16C:
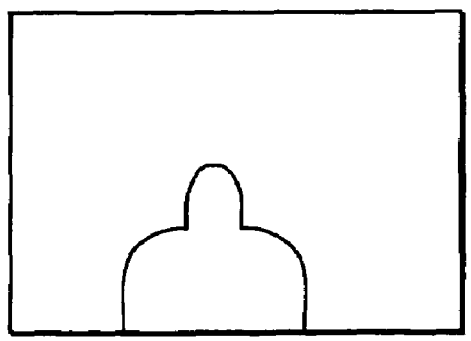

First of all, the user acquires an image (FIG. 16A) having no object to be extracted in the capture range as a background image while checking the screen (step S51). When an object (person) enters the screen as shown in FIG. 16B, the difference between the current input frame and the background image is obtained. Each pixel for which the absolute value of the difference is equal to or larger than a predetermined value is determined as an object pixel, and other pixels are determined as background pixels, thus generating initial shape data (FIG. 16C) (step S52).

If, however, this processing is simply performed in units of pixels, a region is likely to be divided in isolated dot-like patterns. For this reason, the background image is divided into blocks, and the average of the pixel values of each block (block average) is obtained in advance. Likewise, the block average of the input image is obtained. Each block for which the absolute value of the difference between the block average of the input image and that of the background image is larger than a predetermined value is determined as an object region, and other blocks are determined as background regions, thus generating initial shape data. If processing is performed in units of blocks in this manner, only shape data with a stepped contour can be obtained. No problem is, however, posed because contour correction is performed in step S53. In addition, the sum of the absolute values of the differences obtained in units of pixels is obtained in each block. If the sum in the block is larger than a predetermined value, the block is added to the object region. This makes it possible to prevent a detection error, i.e., an error that occurs when a block average obtained for an object region with a texture different from that of the background is close to the block average of the background, the object region is not determined as an object.

In step S53, the contour line of the shape data is matched to the contour line of the object in the image data by using the initial shape data and current input image data, and the flow advances to the step of processing the next frame (step S54). If the background stands still, object extraction can be accurately performed by this embodiment regardless of the shape of an object, the number of objects, and the location of the objects in the screen.

Fifth Embodiment

Figure 17:
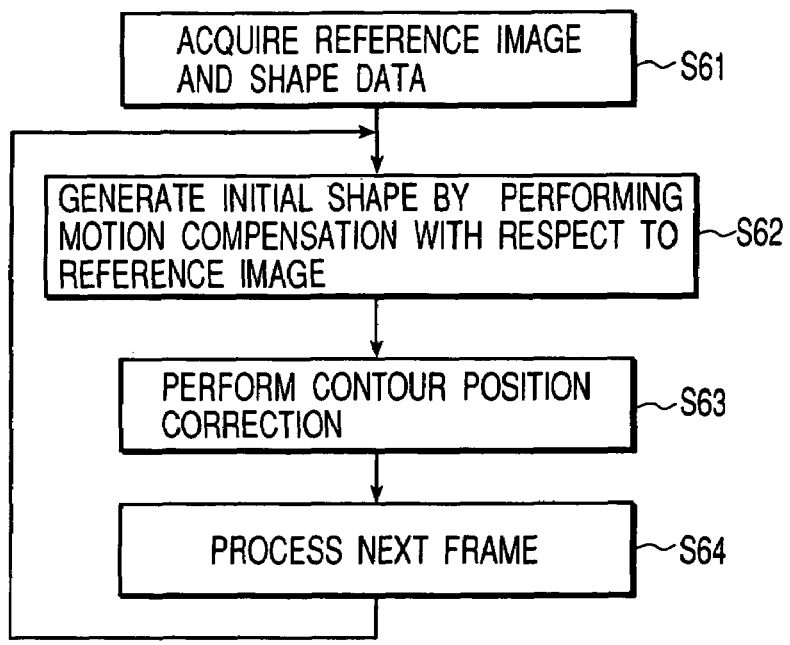
FIG. 17 is a flow chart for explaining an image contour extraction method according to the fifth embodiment of the present invention.

The fifth embodiment in which initial shape data is generated by motion compensation with respect to a reference frame will be described next with reference to FIG. 17.

First of all, by using a method using fixed initial shape data, the user extracts the contour of the head portion while matching the head portion to the display on the screen. In this contour extraction, the user performs image acquiring operation while checking whether the contour is correctly extracted. The image and final shape data at this time are respectively set as reference image data and reference shape data (step S61).

Figure 18:
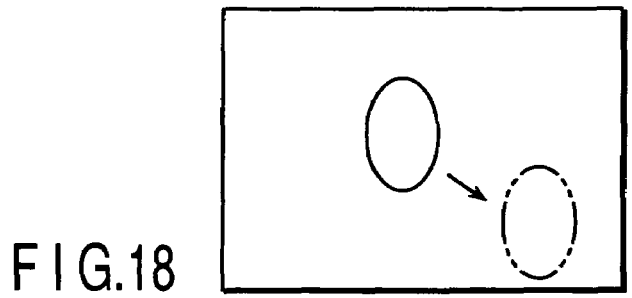
FIG. 18 is a view for explaining an image contour extraction method according to the fifth embodiment.

Subsequently, motion of the image data from the reference image data to the current input frame, like that shown in FIG. 18, is detected. The initial shape data of the current input frame is generated by using this motion detection result and performing motion compensation for the reference shape data (step S62). For example, the image data of an object region in a reference frame is cut, and matching is performed while the object region is translated in the current input frame. Initial shape data is generated by translating the object region of the reference shape data to a portion where the matching error is minimum. Thereafter, the contour line of the shape data is matched to the contour line of the object in the image data by using the initial shape data and current input image data, i.e., contour position correction is performed (step S63). The flow then advances to the step of processing the next step (step S64).

According to this embodiment, although the user must adjust the position of his/her head portion at first while checking the screen, the object can be extracted regardless of its position on the screen after the reference image is acquired as long as the same surface of object keeps facing the camera owing to motion compensation. Motion detection is not limited to two parameters for translation. If the number of parameters is increased to, for example, two, including rotation, four, including enlargement/reduction, or six, including affine transformation, the precision improves although the processing amount increases.

If it is known in advance that an object does not move much from its initial position, an initial reference frame need not be changed. If, however, an object gradually moves from its initial position, a reference frame is properly updated. If, for example, the reference frame is updated in units of frames to always perform motion compensation for the immediately preceding frame, the object can be properly extracted even when the object greatly moves over time.

Figure 19A:
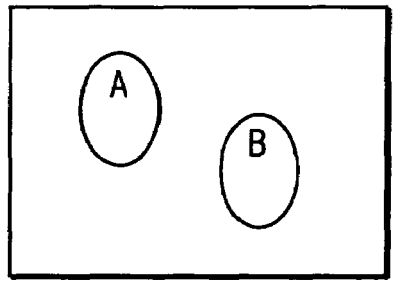
FIGS. 19A, 19B, 19C, and 19D are views for explaining how objects cross each other.

An embodiment for simultaneously extracting a plurality of objects while discriminating them will be described next. Assume that given objects A and B are extracted while they are spaced apart from each other, as shown in FIG. 19A, and they are traced and extracted in the subsequent frames while they are discriminated. In this case, a method that can be easily implemented is a method of extracting the objects according to the third and fourth embodiments and determining objects as the same object, for which a large number of pixels overlap one another between frames. In this method, however, if the objects A and B in the state shown in FIG. 19A changes to the states shown in FIGS. 19B, 19C, and 19D, and partly overlap in the process of change, the object regions merge with each other in the states shown in FIGS. 19B and 19C. As a result, in the state shown in FIG. 19D, the objects A and B cannot be discriminated from each other. In order to cope with this situation, the fifth embodiment is applied to the two objects to discriminate the motion-compensated objects as the same object.

Figure 19B:
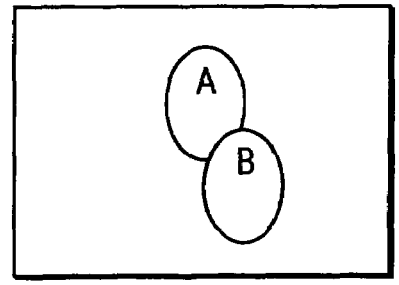
Figure 19C:
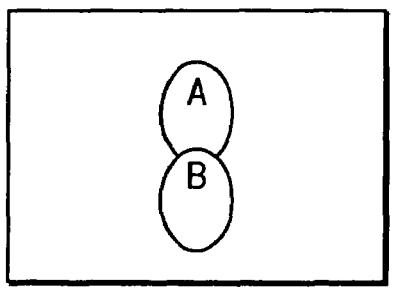
Figure 19D:
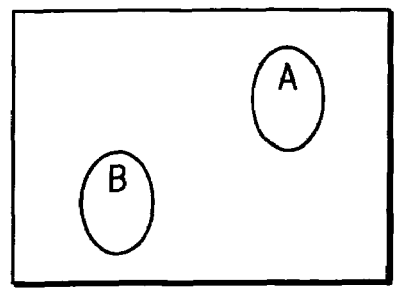
Figure 20:
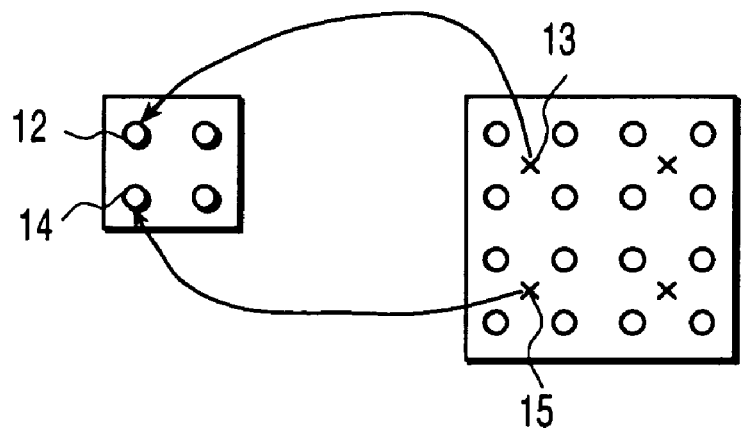
FIG. 20 is a view for explaining pixel value sampling.

An example of performing contour position correction by using the self-affine mapping method when initial shape data is obtained by motion compensation as shown in FIG. 19B will be described with reference to FIGS. 20 and 21. In this case, in the shape data, the pixel value 1 is assigned to each pixel determined as a pixel belonging to the region of the object A, and the pixel value 2 is assigned to each pixel belonging to the object B. The pixel value 0 is assigned to each pixel that belongs to neither the object A nor the object B. This embodiment aims at correcting the contour of such shape data, i.e., the boundary between 0 and 1, the boundary between 0 and 2, and the boundary between 1 and 2, to the contour of the object in the image data, i.e., the boundary between the background and the object A, the boundary between the background and the object B, and the boundary between the object A and the object B. According to the prior application, shape data (identical to alphamap, alphadata, and alphamask) is a binary image. Note that in this embodiment, shape data is a ternary image consisting of {0, 1, 2}.

Figure 21:
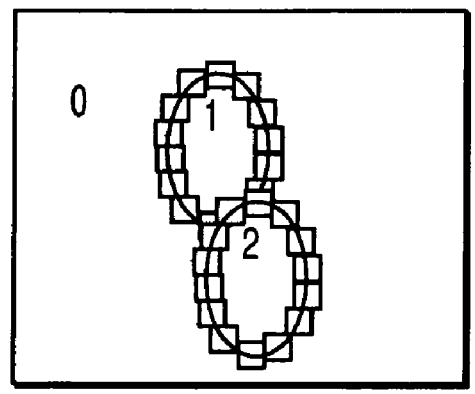
FIG. 21 is a view for explaining the arrangement of blocks for identifying a plurality of objects.

First of all, as shown in FIG. 21, blocks are arranged along the contour of shape data. For this purpose, the shape data is raster-scanned to sequentially set a block around a pixel which has a pixel value different from that of an adjacent pixel and is not included in any of the previously set blocks. According to this method, blocks are linked together in an overlapping state. As disclosed in U.S. patent application Ser. No. 09/222,876, a method of separately arranging blocks is also available. A search for a similar block is then made by using the image data in units of blocks.

Finally, the shape data of each block is replaced with the reduced shape data of a corresponding similar block. If, for example, a block consists of 2×2 pixels, and a similar block consists of 4×4 pixels, a point 13 is a sampling point in the similar block corresponding to a pixel 12, as shown in FIG. 20. The pixel values of the four pixels around the point 13 are checked, and the majority pixel value (0, 1, or 2) is used as a sampling value. The pixel 12 is replaced with this value. A pixel 14 is also replaced with the pixel value obtained by using the four pixels around a point 15. By repeating pixel value replacement in all blocks a plurality of number of times, the contour of the shape data is brought close to the contour of the object in the image data, and converges to a matched state.

According to this method, objects are traced while being discriminated from each other, and extraction can be performed along the contour. Note that if the number of objects is three or more, the number of types, i.e., labels, of pixel values is increased accordingly. Even if the number of labels increases, a sampling value is determined by majority as in the above case.

In a portion where blocks overlap, a plurality of sampling points correspond to one pixel. In this case, in performing the above replacement in units of blocks, the last value replacing a pixel is regarded as effective. Alternatively, a value that replaces a pixel is determined by majority using pixels around a plurality of sampling points, e.g., a total of 12 pixels around three sampling points.

Figure 22A:
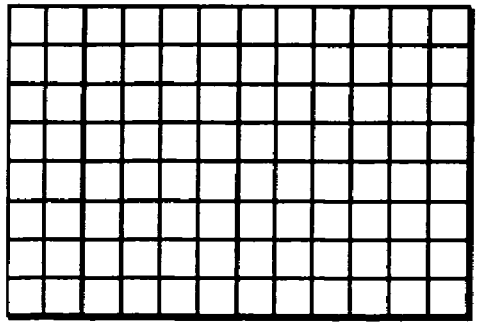
FIGS. 22A and 22B are views respectively showing a frame divided into blocks ad a segmentation image.

The contour extraction correction method using three or more labels, used in this embodiment, can also be used for segmentation of an image. Assume that the arrangement of blocks is equivalent to that obtained by dividing the entire screen, as shown in FIG. 22A. The processing of obtaining a similar block for each block using this image data is the same as that in step S42 in FIG. 14 or the like. As initial shape data, for example, data in which labels are randomly assigned to the respective pixels is prepared. The number of labels is determined in advance. Alternatively, the screen is divided into square blocks, and labels are assigned to the respective blocks. This block division method may or may not be the same as that show in FIG. 14. The pixel values of image data may be quantized, and labels are assigned to the respective quantization levels.

Figure 22B:
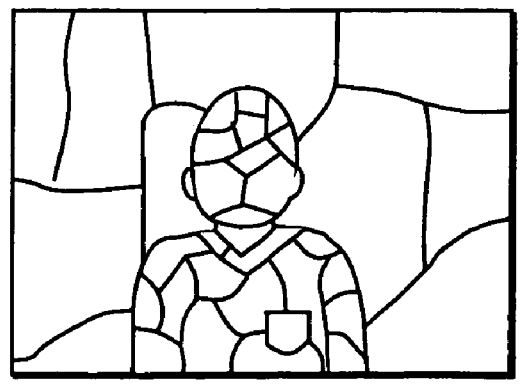

When replacement of a block with a similar block is repeated for the initial shape data generated in this manner, the initial shape data converges to shape data. A segmentation image is obtained as an image painted in different colors in units of labels of the convergent shape data, as shown in FIG. 22B. In the fifth embodiment, in setting a reference frame, this segmentation image may be displayed, and the user may select regions belonging to the object one by one, thereby setting an object region of the reference frame.

Sixth Embodiment

A video transmission system using the object extraction method of the present invention will be described next as the sixth embodiment with reference to FIGS. 23, 24, and 25.

Figure 23:
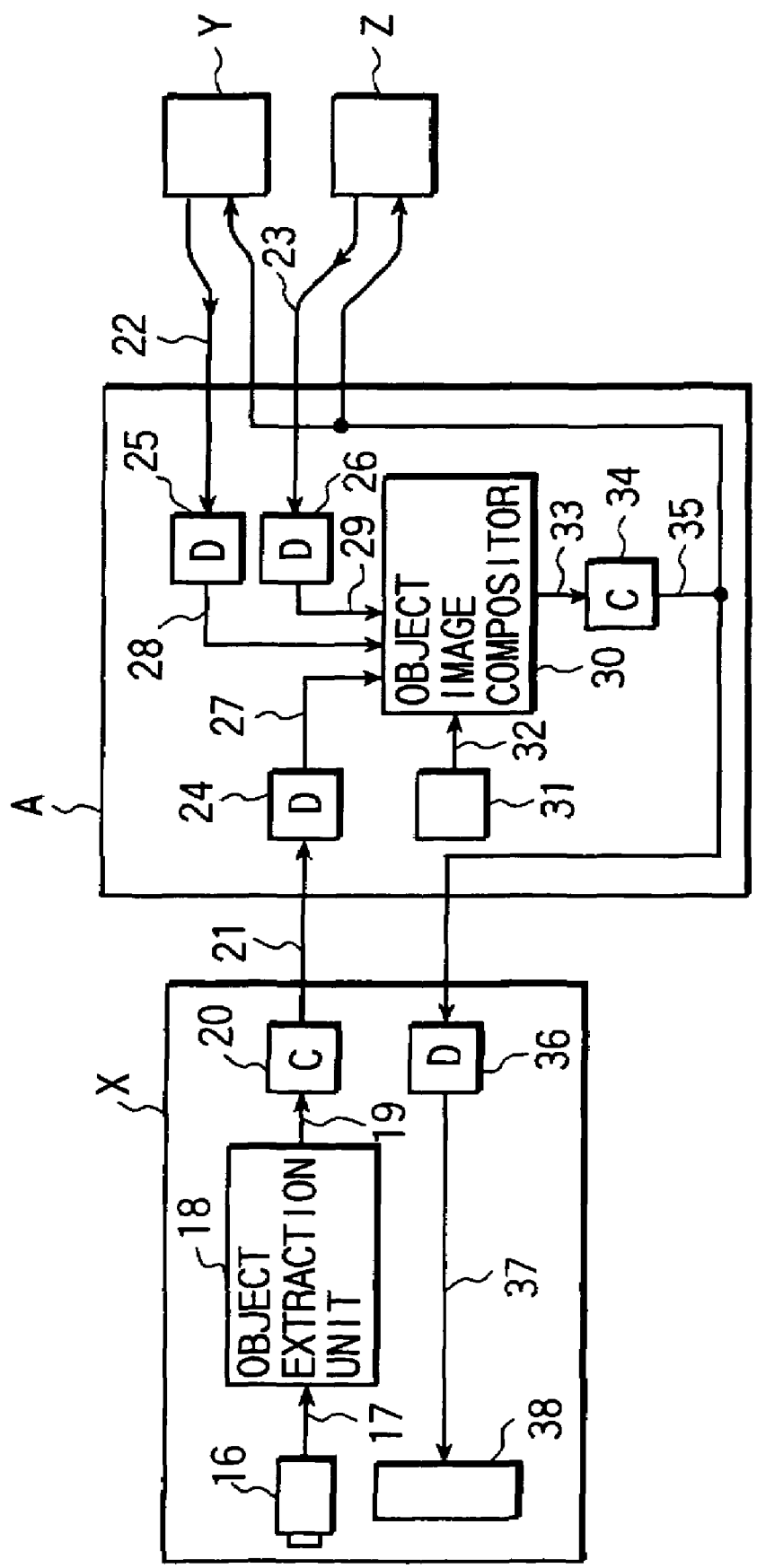
FIG. 23 is a block diagram showing a video transmission system according to the sixth embodiment.
Figure 24:
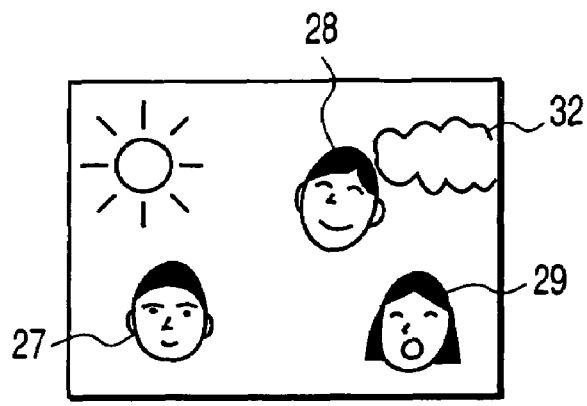
FIG. 24 is a view showing a composite image formed in the sixth embodiment.

Referring to FIG. 23, a video transceiver terminal X, e.g., a cellular phone, personal computer, or game machine includes a terminal built-in camera 16, object extraction unit 18, encoder 20, decoder 36, and display 38. Other video transceiver terminals Y and Z have the same arrangement as that of the terminal X.

A video delivery center A connected to these video transceiver terminals X, Y, and Z includes decoders 24, 25, and 26 respectively connected to the terminals X, Y, and Z, a compositor 30 connected to these decoders, a background memory 31, and an encoder 34.

In this arrangement, an image of the user of the terminal X is taken by the terminal built-in camera 16, and resultant image data 17 is sent to the object extraction unit 18. The object extraction unit 18 cuts an image of the face of the user by the technique according to the third, fourth, or fifth embodiments or the like, and face image data 19 is sent to the encoder 20. The face image data is a combination of data identical to the image data 17 and shape data (alphamap, alphadata, or alphamask) representing the face region. The encoder 20 encodes the face image data by the MPEG-4 scheme which is an internal standard of moving image encoding. Compressed data 21 is then sent to the video delivery center A through a communication line.

Face images of the respective users from the terminals Y and Z located at distances from the terminal X are compressed and set as compressed data 22 and 23 to the center A. In the center A, the decoders 24, 25, and 26 respectively decode the received compressed data 21, 22, and 23 into face image data 27, 28, and 28, which are then sent to the object image compositor 30.

A background image 32 is also input from the background memory 31 to the compositor 30. As shown in FIG. 24, the compositor 30 composites the face image data 27, 28, and 29 with the background image 32. A composite image 33 is sent to an encoder 34. The encoder 34 compresses the composite image 33 as a general rectangular image by the MPEG-4 scheme or the like, and compressed data 35 is sent to the terminals X, Y, and Z.

The terminal X sends the received compressed data 35 to a decoder 36. The decoder 36 reproduces the composite image. A composite image 37 is sent to the terminal-built in display 38, and the image identical to the one shown in FIG. 24 is displayed. The compressed data 35 is also sent to the terminals Y and Z, and identical composite images are displayed on the terminals Y and Z.

If voice data is also transmitted to the terminals, a real-time chat system can be implemented by this system, in which users can enjoy chats with each other while seeing each other in the face and sharing a cyberspace.

Figure 25:
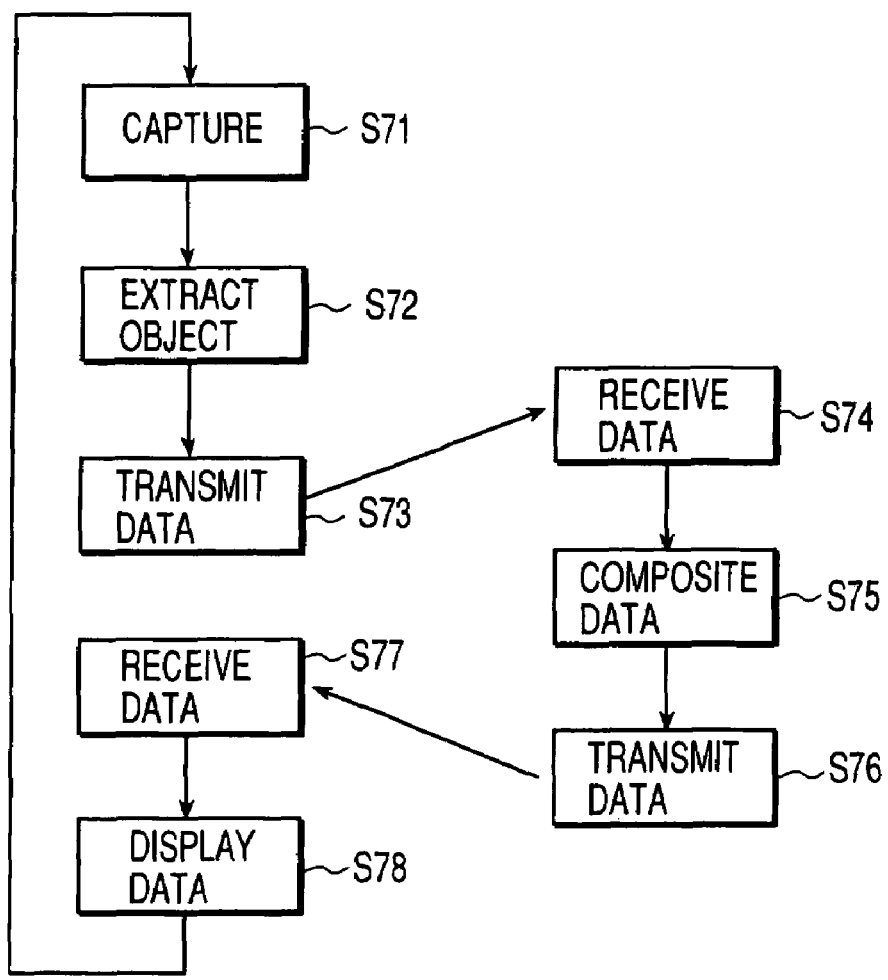
FIG. 25 is a flow chart showing a procedure in the video transmission system according to the sixth embodiment.

FIG. 25 shows procedures in terminals of this system and the video delivery center. Referring to FIG. 25, the left flow represents the procedure in each terminal, and the right flow represents the procedure in the video delivery center.

According to these procedures, first of all, images are captured (step S71). Face images are then extracted (step S72). Thereafter, the face image data are compressed. The compressed data are transmitted to the center (step S73).

The center receives the compressed data from the terminals and reproduces them into face image data (step S74). The reproduced face image data are superposed on a composite image (step S75). The composite image is compressed, and the compressed data is transmitted to the terminals (step S76).

Each terminal receives the compressed data from the center and reproduces it into a composite image (step S77). This reproduced composite image is displayed on the display of the terminal (step S78). Thereafter, the flow returns to step S71.

Note that in step S74 in the video delivery center, a plurality of compressed data are received, and a plurality of face images are synthesized.

Seventh Embodiment

Another video transmission system according to the seventh embodiment which implements the same function as that described above without using any image distribution center A will be described with reference to FIG. 26. In this system, a terminal X generates face image data 19 and generates compressed data 21 through an encoder 20 in the same manner as in the above system. Therefore, a description of this operation will be omitted.

The compressed data 21 is sent to terminals Y and Z through communication lines. Likewise, compressed data 22 and 23 are sent from the terminals Y and Z to the terminal X. In addition, the compressed data are mutually transmitted between the terminals Y and Z. The compressed data 22 and 23 received by the terminal X are respectively decoded by decoders 39 and 40, and face image data 41 and 42 are sent to a compositor 43. The compositor 43 also receives the face image data 19 of the user of the terminal X, and composites these data with a background image 45 sent from a background memory 44. A composite image 46 is then sent to a display section 47 to be displayed. Data are also sent to the terminals Y and Z in the same manner as described above, and the resultant composite images are respectively displayed on the display sections.

In this system, the processing amount in each terminal increases, and each terminal must simultaneously communicate with a plurality of distant terminals. However, no video delivery center is required, and the user of each terminal can arbitrarily determine an arrangement for a background image and face images.

Figure 26:
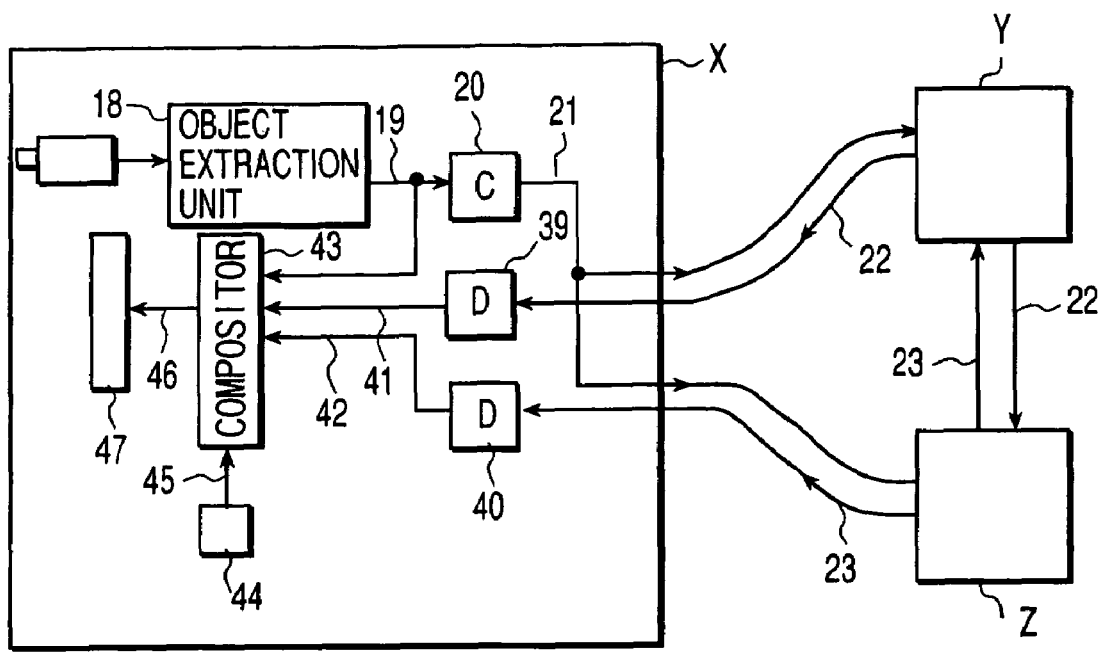
FIG. 26 is a block diagram showing a video transmission system according to the seventh embodiment.
Figure 27:
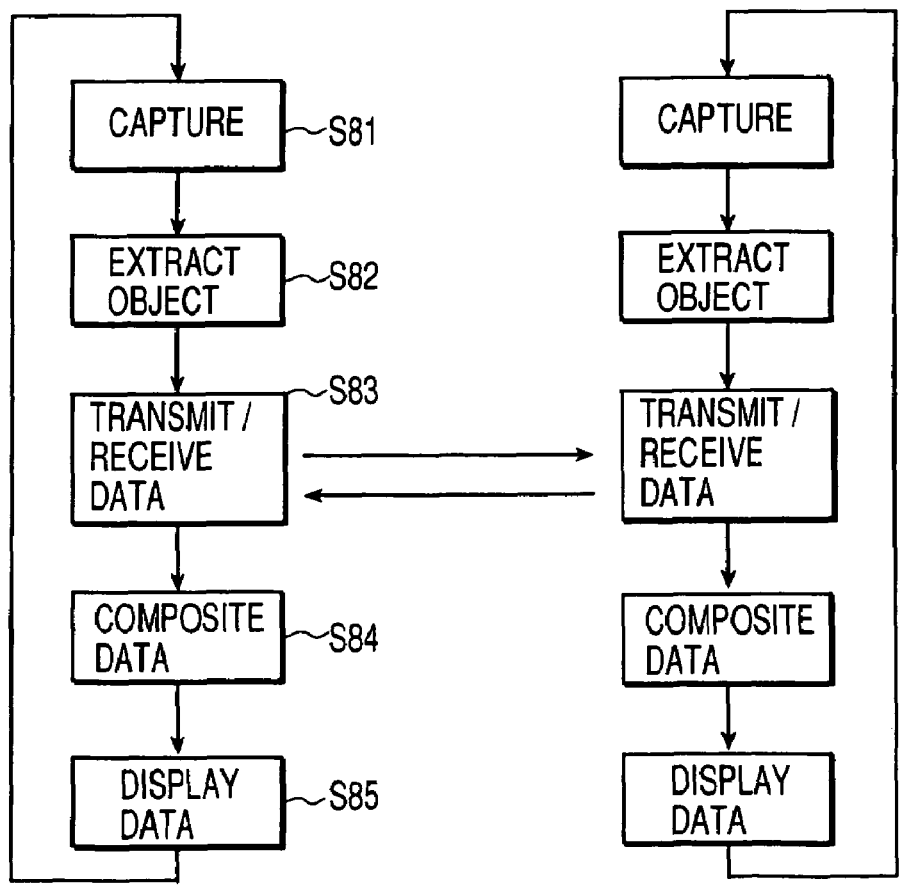
FIG. 27 is a flow chart showing procedures in the video transmission system according to the seventh embodiment.

FIG. 27 shows the procedure in the system in FIG. 26. According to this procedure, first of all, an image is captured (step S81). An object is then extracted. That is, a face image is extracted (step S82). The extracted image, e.g., the image data of the face of the user himself/herself, is compressed. The compressed data is transmitted to another terminal (step S83). At the same time, the terminal receives compressed data from another terminal and reproduces it into the image data of the face of another user. The image data of the face of the user is synthesized with the image data of the face of another user to generate a composite image (step S84). This composite image is displayed (step S85). The flow then returns to step S81.

The right side of FIG. 27 shows the procedure in another terminal. This procedure is the same as that on the left side.

In generating a composite image, it may be automatically determined whether face images are properly obtained, i.e., faces are properly extracted. If face images are obtained, they may be synthesized with a background. If extraction has failed and no face image is obtained, the image data is not synthesized with the background, thereby preventing unnecessary portions other than faces from being erroneously synthesized with the background. In performing this determination, the number of pixels corresponding to the flesh-colored portion in an object region is counted. If the ratio of the number of pixels corresponding to the flesh-colored portion to the total number of pixels in the object region is equal to or higher than a predetermined value, a face image is determined. If the ratio is lower than the predetermined value, it is determined that the corresponding portion is not a face image. In determining a flesh color, for example, for an image in which the color of each pixel consists of three colors, i.e., Y, U, and V, and each color is expressed by values 0 to 255, the color given by U=100 and V=160 is set as a criterion for a flesh color. When the absolute value of the difference between the value of U of image data and the value 110 is smaller than a predetermined value, and the absolute value of the difference between the value of V and the value 160 is smaller than a predetermined value, the corresponding pixel is determined as a pixel corresponding to the flesh-colored portion.

The determination whether a given portion is a face image may be made by the compositor 30 or 43. If, however, this determination is made by an encoder, and the encoder does not encode a given portion if it is not a face image, the communication amount can be reduced.

As the display 38 or 47, a display unit other than the terminal, e.g., a TV set, may be used. In this case, if an image is transmitted to the TV set by using a radio unit such as a Bluetooth system, the user can be free from troublesome wiring. In addition, the background images 32 and 45 need not be read out from the background memories 31 and 44, and broadcast images from a TV set or the like may be received instead. This allows users at distant locations to enjoy a TV program together while seeing each other.

For example, the video delivery center A can prepare face images of starts as images to be synthesized, and provide a service of synthesizing the face of a certain start with the face of the user of a terminal side by side and transmitting the resultant image in accordance with a request from the user. As background images as well, background images featuring popular characters may be prepared, and a background image is selected in accordance with a request from a user.

The present invention is not limited to the embodiments described above, and can be variously modified and executed. The techniques described in the above embodiments can be stored as computer-readable programs in a storage medium such as a magnetic disk (e.g., a floppy disk or hard disk), an optical disk (e.g., a CD-ROM or DVD), or a semiconductor memory and can be distributed.

As has been described above, according to the present invention, the processing of bringing the contour of provisional shape data (alphamap) close to the contour of a contour extraction object can be executed while the computation amount is greatly reduced. Therefore, an image contour extraction method capable of fast contour extraction can be provided.

In addition, according to the present invention, initial shape data can be automatically obtained regardless of the position of an object in a frame, and an object can be extracted without any operation by the user or with little operation by the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmission system comprising a server and plural clients, which mutually transmit/receive transmission/reception data, the clients each including:

an object extraction unit configured to extract an object from moving image data obtained by capturing the object using a camera to obtain first object image data, the object extraction unit comprising:

means for inputting image data representing an original image and shape data indicating a binary image representing a first provisional shape corresponding to the object in the original image based on the moving image data;

means for executing coarse adjustment including:

means for reducing the original image and the first provisional shape in size on the basis of the image data and the shape data to generate a reduced original image and a reduced first provisional shape, means for arranging a plurality of first search reference blocks each having a first size on a contour of the reduced first provisional shape, means for searching, for each of the first search reference blocks, the reduced original image for a first similar block having a texture similar to that of a corresponding one of the first search reference blocks and having a second size larger than the first size, and means for replacing all the second search reference blocks with second correction shape blocks obtained by extracting the first similar block from the reduced first provisional shape and reducing the extracted similar block to the first size for each of the first search reference blocks to coarsely bring a contour of the first provisional region close to a contour of the original image;

means for executing main adjustment including:

means for restoring the reduced first provisional region to an original size to produce a second provisional region, means for arranging a plurality of second search reference blocks each having a third size on a contour of the second provisional region, means for searching, for each of the second search reference blocks, the original image for a second similar block having a texture similar to that of a corresponding one of the second search reference blocks and having a fourth size larger than the third size, and means for replacing all the second search reference blocks with second correction blocks obtained by extracting the second similar block from the second provisional shape for each of the second search reference blocks to bring a contour of the second provisional shape close to the contour of the original image, whereby the object is extracted from image data;

a client transmission unit configured to transmit the first object image data as down stream transmission/reception data to the server without any change or upon compression;

a client reception unit configured to receive upstream transmission/reception data sent from the server and handle the transmission/reception data as second object image data if the data is non-compressed, and reproduce the second object image data if the data is compressed; and a display which displays the second object image data, and the server including:

a server reception unit configured to receive the downstream transmission/reception data from each of the clients, handle the transmission/reception data as the first object image data if the data is non-compressed, and reproduce the first object image data if the data is compressed, a composite unit configured to combine the first object image data received from the clients to produce one composite image data, and a server transmission configured to transmit the composite image data as the upstream transmission/reception data without any change or upon compression to the clients.

2. The transmission system according to claim 1, wherein the object extraction unit is configured to extract a face image of a user from the image data.

3. The transmission system according to claim 1, wherein the transmission unit includes means for compressing the extracted image data and means for transmitting compressed image data.

4. The transmission system according to claim 3, wherein the reception unit includes means for decoding the compressed image data.

5. The transmission system according to claim 1, wherein the image data is moving image data.

6. The transmission system according to claim 1, wherein the composite unit includes a composite unit configured to composite compressed object image data with non-compressed object image data to produce the composite image data.

7. A transmission system comprising a plurality of communication terminals for mutually transmitting/receiving transmission/reception data, each of the communication terminals including:

an object extraction unit configured to extract an object from moving image data obtained by capturing the object using a camera to obtain object image data, the object extraction unit comprising:

means for inputting image data representing an original image and shape data indicating a binary image representing a first provisional shape corresponding to the object in the original image based on the moving image data;

means for executing coarse adjustment including:

reducing the original image and the first provisional shape in size on the basis of the image data and the shape data to generate a reduced original image and a reduced first provisional shape, means for arranging a plurality of first search reference blocks each having a first size on a contour of the reduced first provisional shape, means for searching, for each of the first search reference blocks, the reduced original image for a first similar block having a texture similar to that of a corresponding one of the first search reference blocks and having a second size larger than the first size, and means for replacing all the second search reference blocks with second correction shape blocks obtained by extracting the first similar block from the reduced first provisional shape and reducing the extracted similar block to the first size for each of the first search reference blocks to coarsely bring a contour of the first provisional region close to a contour of the original image;

means for executing main adjustment including:

means for restoring the reduced first provisional region to an original size to produce a second provisional region, means for arranging a plurality of second search reference blocks each having a third size on a contour of the second provisional region, means for searching, for each of the second search reference blocks, the original image for a second similar block having a texture similar to that of a corresponding one of the second search reference blocks and having a fourth size larger than the third size, and means for replacing all the second search reference blocks with second correction blocks obtained by extracting the second similar block from the second provisional shape for each of the second search reference blocks to bring a contour of the second provisional shape close to the contour of the original image, whereby the object is extracted from image data;

a transmission unit configured to transmit the object image data to another communication terminal of the communication terminals without any change or upon compression;

a reception unit configured to receive object image data sent from one or more other communication terminals of the communication terminals, handle the object image data without any change if the data is non-compressed, and reproduce the object image data if the data is compressed;

a composite unit configured to combine the object image data to produce one composite image data; and a display which displays the composite image data.

8. The transmission system according to claim 7, wherein the object extraction unit is configured to extract a face image of a user from the image data.

9. The transmission system according to claim 7, wherein the transmission unit includes means for compressing the extracted image data and means for transmitting compressed image data.

10. The transmission system according to claim 9, wherein the reception unit includes means for decoding the compressed image data.

11. The transmission system according to claim 7, wherein the image data is moving image data.

12. The transmission system according to claim 7, wherein the composite unit includes a composite unit configured to composite compressed object image data with non-compressed object image data to produce the composite image data.

* * * * *